(12) United States Patent
Lee et al.

(10) Patent No.: US 11,829,593 B2
(45) Date of Patent: Nov. 28, 2023

(54) METHOD FOR PROVIDING CONTENTS BY USING WIDGET IN MOBILE ELECTRONIC DEVICE AND SYSTEM THEREOF

(71) Applicants: Bytemix Corp., Gwangju-si (KR); Won Ho Shin, Incheon (KR)

(72) Inventors: Jae Moon Lee, Gwangju-si (KR); Won Ho Shin, Incheon (KR)

(73) Assignee: BYTEMIX CORP., Gwangju-si (KR)

( * ) Notice: Subject to any disclaimer, the term of this patent is extended or adjusted under 35 U.S.C. 154(b) by 3 days.

(21) Appl. No.: 17/671,289

(22) Filed: Feb. 14, 2022

(65) Prior Publication Data
US 2022/0350471 A1 Nov. 3, 2022

(30) Foreign Application Priority Data

Apr. 30, 2021 (KR) .................. 10-2021-0056868
Aug. 23, 2021 (KR) .................. 10-2021-0111299

(51) Int. Cl.
*G06F 3/0484* (2022.01)
*G06F 3/04845* (2022.01)
(Continued)

(52) U.S. Cl.
CPC ........ *G06F 3/04845* (2013.01); *G06F 3/0482* (2013.01); *G06F 3/04883* (2013.01);
(Continued)

(58) Field of Classification Search
CPC .............. G06F 3/04845; G06F 3/0482; G06F 3/04883; G06V 20/50; G06Q 30/0277;
(Continued)

(56) References Cited

U.S. PATENT DOCUMENTS 8,521,857 B2 * 8/2013 Maxwell .............. G11B 27/105
715/802
8,595,186 B1 * 11/2013 Mandyam ................ G06F 8/38
717/178
(Continued)

FOREIGN PATENT DOCUMENTS

KR 10-2012-0042785 A 5/2012
KR 10-2012-0091537 A 8/2012
(Continued)

OTHER PUBLICATIONS

Filipe Espósito, "Magnets app lets you create collaborative photo widgets with your friends on iOS 14", Oct. 7, 2020, 9to5Mac, pp. 1-3. (Year: 2020).*
(Continued)

*Primary Examiner* — David E Choi
(74) *Attorney, Agent, or Firm* — NKL Law; Jae Youn Kim

(57) ABSTRACT

A method for providing a tile widget service in a mobile electronic device is provided. The method includes, displaying a first feed corresponding to a first tile that includes a first plurality of picture of a first user and a second feed corresponding to a second tile that includes a first plurality of picture of the first user by using an application for the tile widget service, the first user is different from a second user that is a user of the mobile electronic device, generating a widget of the application in a home screen, in response to commends for generating the widget of the application in the home screen, wherein the first tile is designated by the second user as favorites and the widget is associated with the first tile based on the commends, and displaying a first picture among the first plurality of picture and a comment inputted with respect to the first picture on the widget.

17 Claims, 32 Drawing Sheets

(51) Int. Cl.
*G06T 11/00* (2006.01)
*G06V 20/50* (2022.01)
*G06T 3/40* (2006.01)
*G06F 3/04883* (2022.01)
*G06F 3/0482* (2013.01)
*G06Q 30/0241* (2023.01)
*G06T 3/60* (2006.01)

(52) U.S. Cl.
CPC .......... *G06Q 30/0277* (2013.01); *G06T 3/40* (2013.01); *G06T 3/60* (2013.01); *G06T 11/00* (2013.01); *G06V 20/50* (2022.01); *G06T 2200/24* (2013.01)

(58) Field of Classification Search
CPC ... G06T 3/40; G06T 3/60; G06T 11/00; G06T 2200/24
See application file for complete search history.

(56) References Cited

U.S. PATENT DOCUMENTS

| | | | | |
|---|---|---|---|---|
| 9,253,631 | B1* | 2/2016 | White | H04M 1/72457 |
| 9,654,598 | B1* | 5/2017 | Crawford | H04W 4/023 |
| 11,460,974 | B1* | 10/2022 | Murray | G06Q 50/01 |
| 2007/0038934 | A1* | 2/2007 | Fellman | G06F 3/04847 |
| | | | | 717/100 |
| 2007/0043766 | A1* | 2/2007 | Nicholas | H04L 67/02 |
| 2008/0055273 | A1* | 3/2008 | Forstall | G06F 3/04817 |
| | | | | 345/173 |
| 2008/0083003 | A1* | 4/2008 | Biniak | H04N 21/25891 |
| | | | | 348/E7.071 |
| 2009/0024944 | A1* | 1/2009 | Louch | G06F 3/04842 |
| | | | | 715/764 |
| 2009/0178008 | A1* | 7/2009 | Herz | G06F 3/0488 |
| | | | | 715/840 |
| 2009/0204885 | A1* | 8/2009 | Ellsworth | G06F 16/44 |
| | | | | 707/999.1 |
| 2009/0265356 | A1* | 10/2009 | Hyman | G06Q 30/02 |
| 2009/0288021 | A1* | 11/2009 | Ioffe | H04L 67/34 |
| | | | | 715/765 |
| 2010/0023874 | A1* | 1/2010 | Frohwein | G06Q 30/0255 |
| | | | | 715/747 |
| 2010/0083124 | A1* | 4/2010 | Druzgalski | G06F 16/9537 |
| | | | | 715/738 |
| 2010/0287256 | A1* | 11/2010 | Neilio | G06Q 10/10 |
| | | | | 709/217 |
| 2011/0099507 | A1* | 4/2011 | Nesladek | G01C 21/362 |
| | | | | 345/173 |
| 2013/0263053 | A1* | 10/2013 | Tritschler | G06F 3/04817 |
| | | | | 715/835 |
| 2014/0033074 | A1* | 1/2014 | Thibaux | H04L 67/535 |
| | | | | 715/753 |
| 2014/0101609 | A1* | 4/2014 | Bamford | G06F 3/0489 |
| | | | | 715/810 |
| 2014/0244388 | A1* | 8/2014 | Manouchehri | H04L 51/52 |
| | | | | 705/14.53 |
| 2014/0282166 | A1* | 9/2014 | Temkin | G06F 3/04845 |
| | | | | 715/769 |
| 2016/0078133 | A1* | 3/2016 | Santhanam | G06F 3/0485 |
| | | | | 707/734 |
| 2016/0103594 | A1* | 4/2016 | Greenberg | G06F 40/106 |
| | | | | 715/255 |
| 2016/0105479 | A1* | 4/2016 | McFarland | G06F 40/186 |
| | | | | 709/219 |
| 2016/0373588 | A1* | 12/2016 | Raleigh | H04L 12/1407 |
| 2017/0061476 | A1* | 3/2017 | Manouchehri | G06F 16/48 |
| 2019/0129967 | A1* | 5/2019 | Lemp | H04L 67/025 |
| 2019/0138166 | A1* | 5/2019 | Lemp | G06F 16/9558 |
| 2020/0348822 | A1* | 11/2020 | Dascola | G06F 3/0483 |
| 2021/0073924 | A1* | 3/2021 | Ndeuchi | G06F 16/48 |
| 2021/0385417 | A1* | 12/2021 | Park | G06F 3/04883 |
| 2022/0179665 | A1* | 6/2022 | Rathod | G06F 9/451 |
| 2022/0368742 | A1* | 11/2022 | Chang | H04L 65/1089 |
| 2022/0391056 | A1* | 12/2022 | Dalonzo | G06F 3/0483 |

FOREIGN PATENT DOCUMENTS

| | | |
|---|---|---|
| KR | 10-2013-0054072 A | 5/2013 |
| KR | 10-2013-0096137 A | 8/2013 |
| KR | 10-2015-0006487 A | 1/2015 |
| KR | 10-2016-0004405 A | 1/2016 |
| KR | 10-2016-0039631 A | 4/2016 |
| KR | 10-2016-0075332 A | 6/2016 |
| KR | 10-2017-0117306 A | 10/2017 |
| KR | 10-2018-0024675 A | 3/2018 |
| KR | 10-2019-0124571 A | 11/2019 |
| KR | 10-2019-0133081 A | 12/2019 |

OTHER PUBLICATIONS

Jake Peterson, "Make Your Home Screen's Photo Widget Show Only One Image or Specific Albums in iOS 14 Instead of Random Pics Every Hour", Oct. 7, 2020, Gadget Hacks, pp. 1-5. (Year: 2020).*

Michael Potuck, "Here's how to use the new iPhone home screen widgets in iOS14", Sep. 16, 2020, 9to5Mac, pp. 1-4. (Year: 2020).*

Graphite Staff, "Home Screen Widgets Take Center Stage in iOS 14", Nov. 2, 2020, Graphite Apple Premier Partner, pp. 1-5. ( Year: 2020).*

Paul Diamond, "Introducing new OneDrive widget and home screen for iOS", Sep. 22, 2020, Modern Work, pp. 1-4. (Year: 2020).*

Devendra Chande, "How to Select Specific Photos to Show in Photos Widget on iOS 14", Sep. 24, 2020, ConsideringApple, pp. 1-5. (Year: 2020).*

* cited by examiner

METHOD FOR PROVIDING CONTENTS BY USING WIDGET IN MOBILE ELECTRONIC DEVICE AND SYSTEM THEREOF

CROSS REFERENCE TO RELATED APPLICATION

The present application claims priority to a Korean application 10-2021-0056868, filed Apr. 30, 2021 and a Korean application 10-2021-0111299, filed Aug. 23, 2021, the entire contents of which are incorporated herein for all purposes by this reference.

BACKGROUND OF THE INVENTION

Field of the Invention

The present disclosure relates to a mobile electronics device and, more particularly, to a method for providing contents by using a widget in the mobile electronics device and an apparatus thereof.

DESCRIPTION OF THE RELATED ART

Since an introduction of smartphones in the 2000s, a smartphone market has grown rapidly and is now recognized as a necessity in the modern world. The growth of the smartphone market has derived not only the development of hardware, but also developments in various fields such as related applications and services. In particular, the smartphones have greatly improved accessibility to Internet networks, which has enabled the emergence of various social networking services (SNS) or social media services, and business success thereof.

The SNS is a service that enables users to form a human network on a web. In general, the SNS forms relationships between users and allows them to share contents. The SNS consists of an online space, formation and maintenance of relationships, a structure of relational networks, exchange of information, and the like. Through the SNS, users communicate and exchange information. Sometimes, the SNS is used as an effective marketing tool.

For the effective usage of SNS, it is desirable that an interface is intuitive and easy. Characteristics such as immediacy, convenience and so on are very closely related to users' recognition and are largely affected by changes in society. Therefore, these elements would change as users experience and social perceptions change. As a result, new SNSs with various structures and functions are still being developed continuously.

SUMMARY

An aspect of the present disclosure is to provide a method for effectively providing content using a widget in a mobile electronic device and an apparatus thereof.

Another aspect of the present disclosure is to provide a method for displaying one or more pictures using a widget in a mobile electronic device and an apparatus thereof.

A further aspect of the present disclosure is to provide a method for displaying an advertisement using a widget in a mobile electronic device and an apparatus thereof.

Yet another aspect of the present disclosure is to provide a method for providing a social network service (SNS) having a more effective interface in a mobile electronic device and an apparatus thereof.

Still another aspect of the present disclosure is to provide a method for supporting left-right swiping on a feed including a plurality of pictures in a mobile electronic device and an apparatus thereof.

Yet, a further aspect of the present disclosure is to provide a method for performing an expansion operation by swiping left and right in a mobile electronic device and an apparatus thereof.

According to an embodiment of the present disclosure, a method for providing a tile widget service in a mobile electronic device includes, displaying a first feed corresponding to a first tile that includes a first plurality of pictures of a first user and a second feed corresponding to a second tile that includes a second plurality of pictures of the first user by using an application for the tile widget service, the first user is different from a second user that is a user of the mobile electronic device, generating a widget of the application in a home screen, in response to commands for generating the widget of the application in the home screen, wherein the first tile is designated by the second user as favorites and the widget is associated with the first tile based on the commands, and displaying a first picture among the first plurality of pictures and a comment inputted with respect to the first picture on the widget.

According to an embodiment of the present disclosure, a mobile electronic device for providing a tile widget service includes a memory storing program codes executable by a processor, and the processor coupled to the a memory and configured to: display a first feed corresponding to a first tile that includes a first plurality of picture of a first user and a second feed corresponding to a second tile that includes a first plurality of picture of the first user by using an application for the tile widget service, the first user is different from a second user that is a user of the mobile electronic device, generate a widget of the application in a home screen, in response to commends for generating the widget of the application in the home screen, wherein the first tile is designated by the second user as favorites and the widget is associated with the first tile based on the commends, and display a first picture among the first plurality of picture and a comment inputted with respect to the first picture on the widget.

According to an embodiment of the present disclosure, a computer program product includes a computer readable hardware storage device storing a computer readable program code and the computer readable program code includes an algorithm that when executed by a computer processor of a computing system implements a method. The method includes displaying a first feed corresponding to a first tile that includes a first plurality of pictures of a first user and a second feed corresponding to a second tile that includes a second plurality of pictures of the first user by using an application for the tile widget service, the first user is different from a second user that is a user of the mobile electronic device, generating a widget of the application in a home screen, in response to commands for generating the widget of the application in the home screen, wherein the first tile is designated by the second user as favorites and the widget is associated with the first tile based on the commands, and displaying a first picture among the first plurality of pictures and a comment inputted with respect to the first picture on the widget.

DETAILED DESCRIPTION

Figure 1:
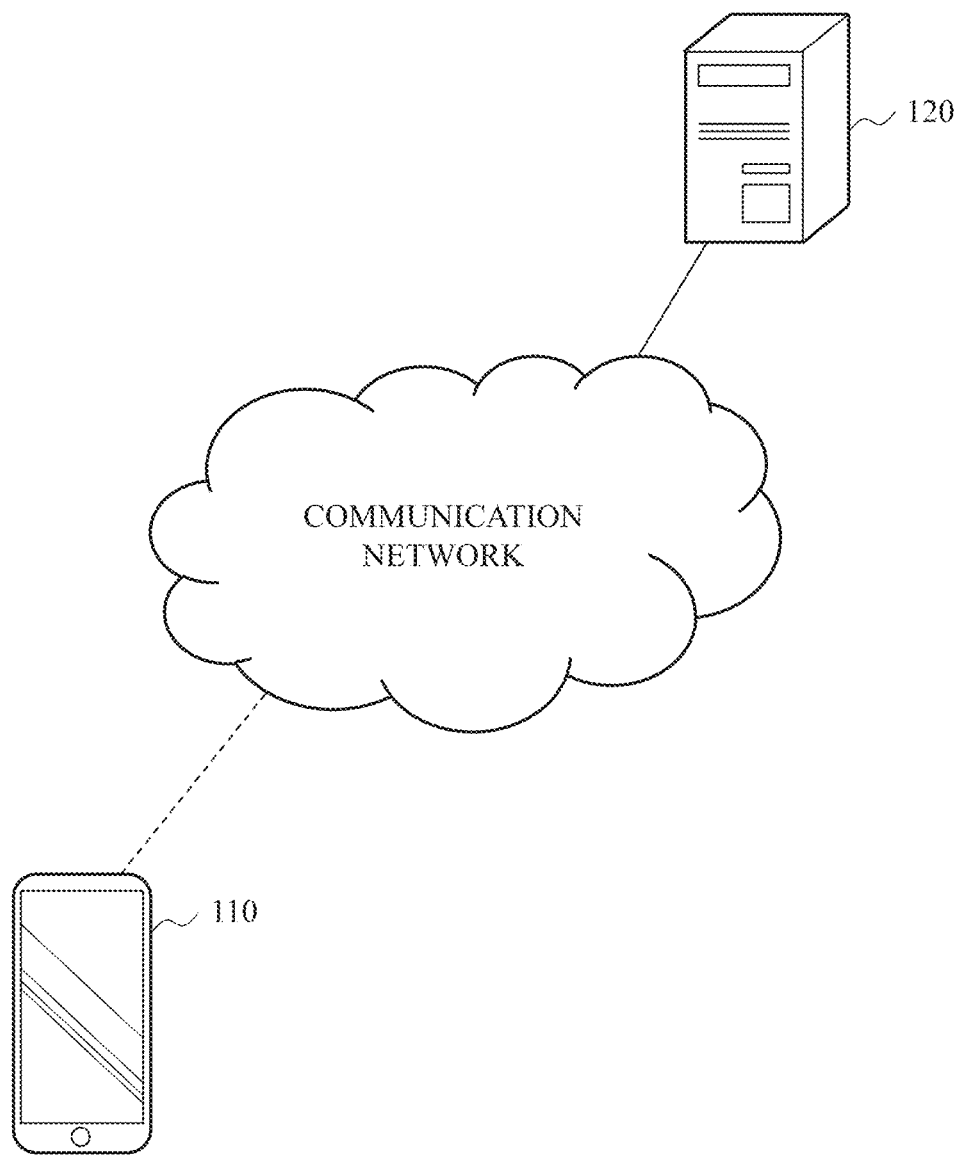
FIG. 1 illustrates a system for providing a service according to an embodiment of the present disclosure.

The following description illustrates only a principle of the present disclosure. Therefore, those skilled in the art may implement the principle of the present disclosure and devise various apparatuses included in the spirit and scope of the present disclosure although not clearly described or shown in the present specification. In addition, it is to be understood that all conditional terms and exemplary embodiments mentioned in the present specification are obviously intended only to allow those skilled in the art to understand a concept of the present disclosure in principle, and the present disclosure is not limited to exemplary embodiments and states particularly mentioned as such.

Further, it is to be understood that all detailed descriptions mentioning specific exemplary embodiments of the present disclosure as well as principles, aspects, and exemplary embodiments of the present disclosure are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore it is to be understood that, for example, a block diagram of the present specification shows a conceptual aspect of an illustrative circuit for embodying a principle of the present disclosure. Similarly, it is to be understood that all flowcharts, state transition views, pseudo-codes, and the like show various processes that may tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make unclear the gist of the present disclosure, it will be omitted.

Hereinafter, various exemplary embodiments of the present disclosure will be described in detail with reference to the accompanying drawings.

The following description with reference to the accompanying drawings is provided to assist in a comprehensive understanding of various embodiments of the present disclosures as defined by the claims and their equivalents.

Hereinafter, the present disclosure describes techniques for providing content using a widget in a mobile electronic device. Particularly, the present disclosure describes an application for social network service (SNS) or social media service whose major function is sharing of pictures (e.g., images, digital photos and so on), and various embodiments for displaying contents by using a widget of the application and further providing an advertising service and various touch-based user interface and user experience (UI/UX).

FIG. 1 illustrates a system for providing a service according to an embodiment of the present disclosure.

Referring to FIG. 1, a mobile electronic device 110 and a server 120 may access a communication network. Through the communication network, the mobile electronic device 110 and the server 120 may perform communication from each other.

The mobile electronic device 110 is a device owned by a user, and a dedicated application for a service according to embodiments of the present disclosure may be installed on the mobile electronic device 110. The mobile electronic device 110 may access the server 120 through the application, upload contents (e.g., pictures, comments, reactions, etc.) to the server 120, and download or receive contents from the server 120.

The server 120 manages contents uploaded from the mobile electronic device 110 and provides the content in response to a request of the mobile electronic device 110. According to an embodiment of the present disclosure, the server 120 may provide contents uploaded by a user as well as advertisement content of an advertiser.

Figure 2:
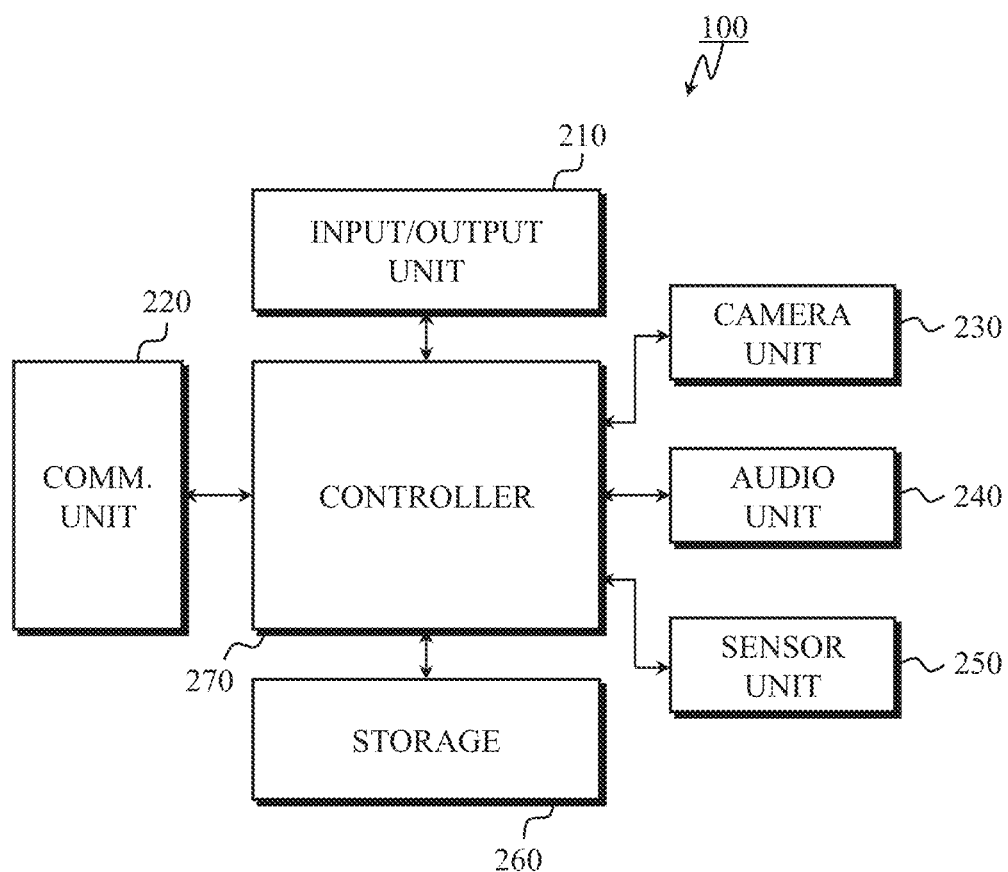
FIG. 2 illustrates a structure of a mobile electronic device according to an embodiment of the present disclosure.

FIG. 2 illustrates a structure of a mobile electronic device 110 according to an embodiment of the present disclosure.

Referring to FIG. 2, the mobile electronic device 110 includes an input/output unit 20, a communication unit (COMM. unit) 230, a camera unit 230, an audio unit 240, a sensor unit 250, a storage 260, and a controller 270.

The input/output unit 210 includes means for displaying a screen and means for sensing an input from outside. Herein, the means for displaying the screen may be implemented as a liquid crystal display (LCD) or the like. The means for sensing an input includes at least one touch pad, at least one key button, at least one sensor, at least one camera, and the like. The input/output unit 210 may include a touch screen in which a display module and a touch pad are combined. In some cases, the input/output unit 210 may be implemented as a set of physically separated two or more hardware modules.

The communication unit 220 performs one or more functions for accessing an external communication network and transmitting and receiving data/signal/information. For example, the communication unit 220 may perform a function of accessing the Internet network, a wireless communication network, a mobile communication network, and the like. For this, the communication unit 220 performs functions such as modulation/demodulation, amplification, and filtering for signals. The communication unit 220 may support communication technologies such as wireless LAN communication (e.g., wireless-fidelity (Wi-Fi)) and cellular communication (e.g., Long Term Evolution (LTE), $5^{th}$ generation (5G), etc.).

The camera unit 230 may perform functions such as taking a picture and recording a video. The camera unit 230 may include an image sensor, a lens, and the like. As the image sensor, at least one of a charged coupled device (CCD) and a complementary metal-oxide semiconductor (CMOS) may be used. For example, the camera unit 230 recognizes light inputted through the lens by using the image sensor, and converts an image recognized by the image sensor into digital data.

The audio unit 240 includes a speaker and the microphone, and performs audio input and output. The audio unit 240 may include a earphone, a headphone, or a headset that are detachable, or may include one or more ports for connecting the earphone, the headphone, the headset, and the like.

The sensor unit 250 detects an external physical phenomenon. The sensor unit 250 may include at least one of an acceleration sensor, a gyro sensor, an optical sensor, a geomagnetic sensor, a gravity sensor (G-sensor), a temperature sensor, a biosensor, and a position sensor. The sensor unit 250 may detect motion, light, tilt, azimuth, and the like, and may generate an electrical signal indicating a detection result.

The storage 260 stores data, programs, micro codes, applications, an so on necessary for operations of the mobile electronic device 110. The storage 260 may be implemented as a temporary or non-transitory storage medium. Also, the storage 260 may be fixed to the device or implemented in a detachable form.

The controller 270 controls the overall operation of the mobile electronic device 110. The controller 270 may include at least one of a processor and a microprocessor. The controller 270 may visually represent information to the user or detect the user's input through the input/output unit 210. The controller 270 may execute a program stored in the storage 260, and may transmit or receive data to or from an external device through the communication unit 220. In addition, the controller 270 may control the camera unit 230 to obtain an image, control the audio unit 240 to output audio or detect a sound, and obtain sensing data through the sensor unit 250. In particular, the controller 270 controls the mobile electronic device 110 to operate according to various embodiments to be described hereafter.

Figure 3:
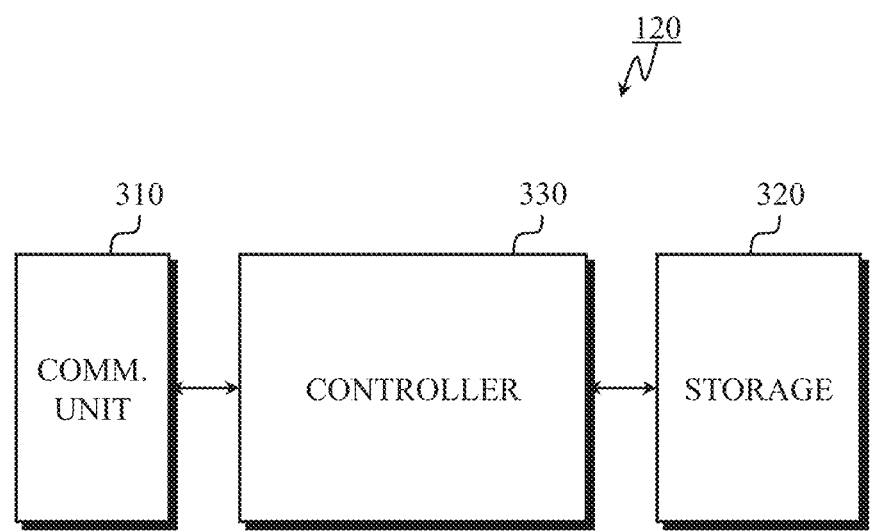
FIG. 3 illustrates a structure of a server according to an embodiment of the present disclosure.

FIG. 3 illustrates a structure of a server 120 according to an embodiment of the present disclosure.

Referring to FIG. 3, the server 120 includes a communication unit (COMM. unit) 310, a storage 320, and a controller 330.

The communication unit 310 performs a function for performing communication with an external device. The communication unit 310 may support wired communication. The storage 320 stores data, programs, micro codes, applications and so on necessary for the operation of the server 120. The storage 320 may be implemented as a temporary or non-transitory storage medium. Also, the storage 320 may be fixed to the device or implemented in a detachable form.

The controller 330 controls the overall operation of the server 120. The controller 330 may include at least one of a processor and a microprocessor. The controller 330 may execute a program stored in the storage 320, and may transmit or receive data to or from an external device through the communication unit 310. In particular, the controller 330 controls the server 120 to operate according to various embodiments to be described later.

The mobile electronic device 110 described with reference to FIGS. 2 and 3 may use a service provided by the server 120. The service according to an embodiment of the present disclosure is a kind of a SNS that posts and shares a content uploaded by a user, for example, a picture, and enables mutual communication between users. In particular, the service according to an embodiment of the present disclosure may be used in the form of a widget, in addition to a way of executing an application. The service according to an embodiment of the present disclosure may be referred to as a 'tile widget'. Hereinafter, various embodiments for providing the tile widget service will be described.

Before describing various embodiments, content units used in the tile widget service are defined as below. The tile widget defines the content units of 'picture', 'tile', and 'album', and the detailed definition are shown in Table 1 below.

TABLE 1

| units | definition |
|---|---|
| Picture | Individual images uploaded by users. A single image file (e.g., one JPG file). |
| Tile | A set of picture(s) to form a group based on the user's designation. It is a unit expressed as a post in a feed, and a unit exposed on a home screen widget. In the tile widget service, it is also used as a unit for setting favorites and a unit for setting whether to public or not. |
| album | A unit for grouping pictures that are selected over a plurality of tiles beyond boundaries of tiles. It is not exposed on the tile, and it can be viewed on a web page by using a uniform resource locator (URL). It is possible to generate a separate group by collecting only the pictures the user wants from among one or more tiles, and furthermore, to share or download the picture(s) in an environment where a tile widget dedicated application is not installed by sharing the album on the web through the URL. A concept for embedding a kind of a viral element in the tile widget service. |

Figure 4A:
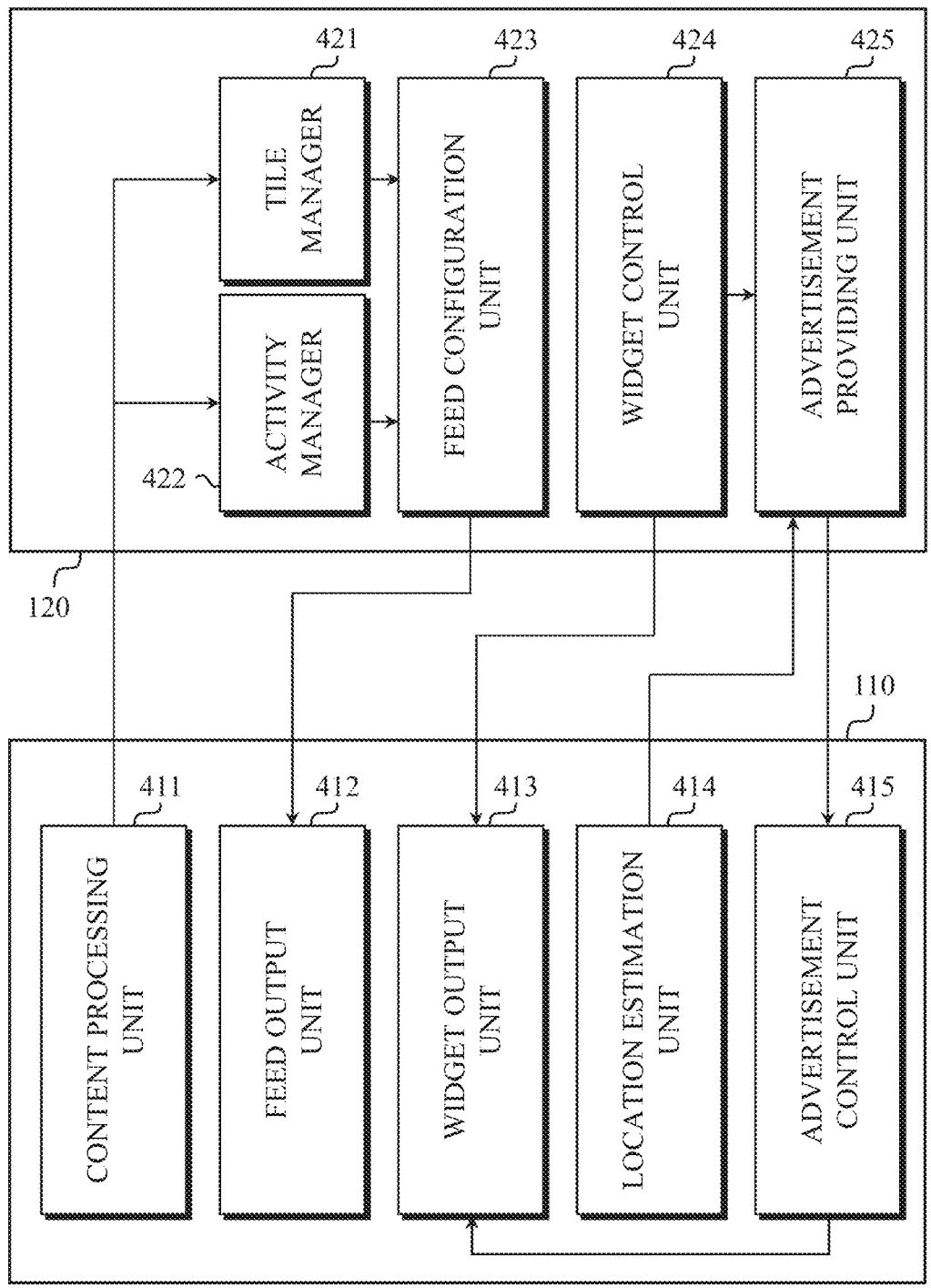
FIG. 4A illustrates an example of a functional structure of a mobile electronic device and a server according to an embodiment of the present disclosure.

FIG. 4A illustrates an example of a functional structure of a mobile electronic device and a server according to an embodiment of the present disclosure. Components of the mobile electronic device 110 shown in FIG. 4A are examples of the functional structures implemented in the mobile electronic device 110 according to execution of an application for a service according to an embodiment of the present disclosure, and components of the server 120 are an example of the functional structure for interacting with the functional structure of the mobile electronic device 110.

Referring to FIG. 4, the mobile electronic device 110 includes a content processing unit 411, a feed output unit 412, a widget output unit 413, a location estimation unit 414, and an advertisement control unit 415. The server 120 includes a tile manager 421, an activity manager 422, a feed configuration unit 423, a widget control unit 424, and an advertisement providing unit 425.

The content processing unit 411 processes contents generated by the user or acquired externally in a format available in the tile widget, and then transmits the processed contents to the server 120. For example, the content processing unit 411 may transmit a picture taken by a user with a camera, or may convert a comment or a reaction input by the user into data and transmit the data. In this case, the image is provided to the tile manager 421, and activity information (e.g., the comment, the reaction, etc.) of the user with respect to a posted picture is provided to the activity manager 422.

The tile manager 421 groups pictures provided from the content processing unit 411 to configure at least one tile, generates the at least one tile in a corresponding user's account, and manages the pictures based on tiles. Here, the tile is a set of pictures constituting one posting unit (i.e., a feed), and may be determined by a user's selection. The activity manager 422 manages activity information of users. The activity information includes comments, reactions and so on that are input by the users on the post. The activity information may be managed in units of the tiles, and may include the number of reaction(s) per type, a list of comment(s), and the like.

The feed configuration unit 423 configures an application screen, that is, at least one feed, by combining the pictures and the activity information managed by the tile manager 421 and the activity manager 422, and provides the application screen to the mobile electronic device 110. At least one feed may be configured based on the user's settings, and may include at least one of post(s) of a corresponding user and post(s) of other user(s). The feed output unit 412 displays the at least one feed on the display based on data provided from the feed configuration unit 423. The at least one feed includes post(s) and interface items corresponding to the post(s) (e.g., buttons, links, comment windows and so on).

The widget output unit 413 operates when a widget of the tile widget service is generated on a home screen. The widget output unit 413 displays a picture on the widget generated on the home screen. When generating the widget, the user may associate a specific tile with the widget, and picture(s) in the associated tile is displayed on the widget. To this end, the widget control unit 424 transmits picture(s) in the corresponding tile to the widget output unit 413.

The location estimation unit 414 provides information related to a location of the mobile electronic device 110 to the server 120. For example, the information related to the location may be location coordinates determined using a global positioning system (GPS) or location-like information such as Internet protocol (IP) address. The information related to the location is provided to the advertisement providing unit 425.

The advertisement providing unit 425 generates advertisement contents to be output on the widget based on the location information and information related to the widget. Then, the advertisement providing unit 425 transmits advertisement contents to the advertisement control unit 415. Accordingly, the advertisement control unit 415 may provide advertisement contents to the widget output unit 413, and the widget output unit 413 may display the advertisement contents on the widget.

Figure 4B:
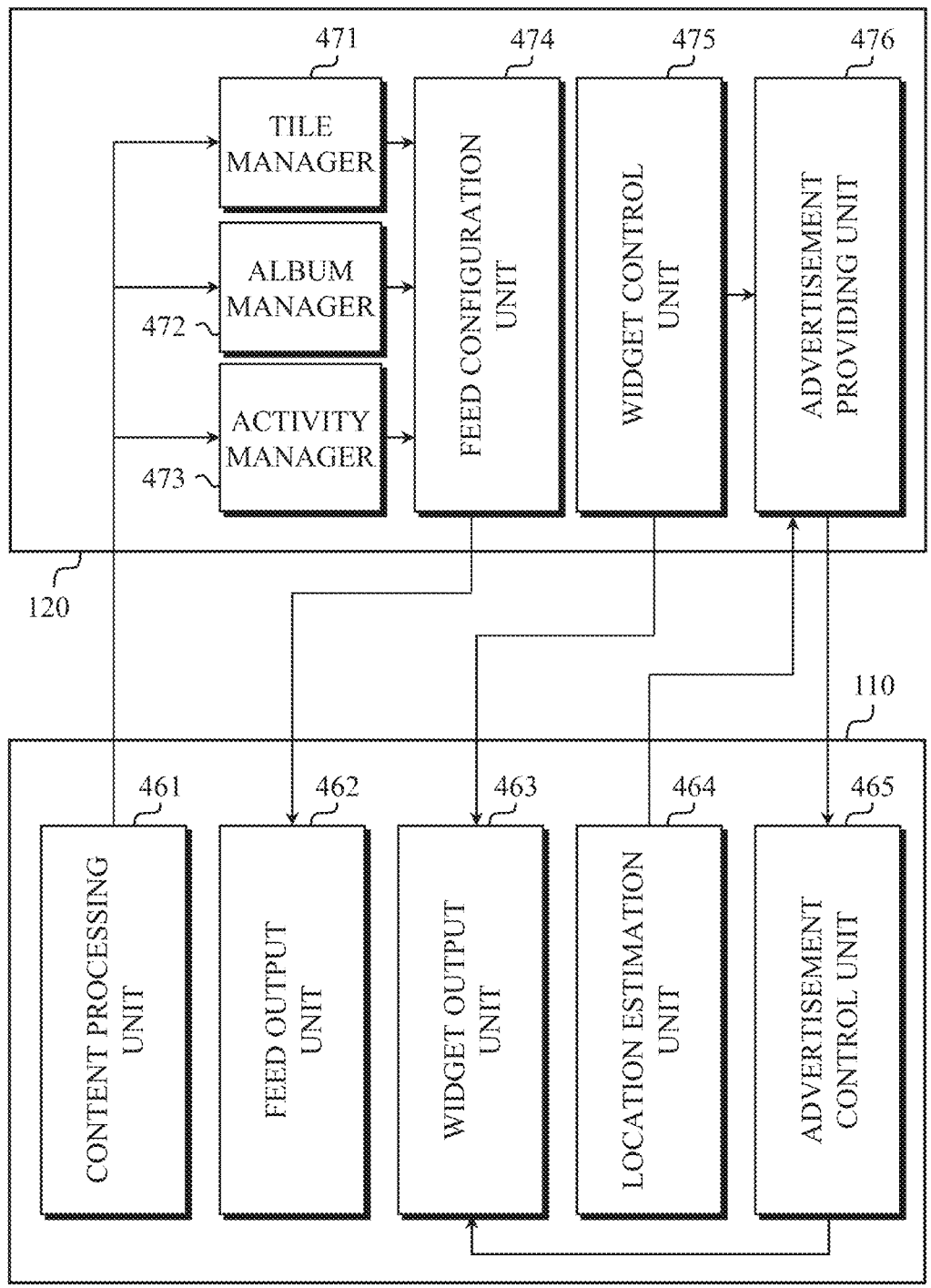
FIG. 4B illustrates another example of functional structures of a mobile electronic device and a server according to an embodiment of the present disclosure.

FIG. 4B illustrates another example of functional structures of a mobile electronic device and a server according to an embodiment of the present disclosure. Components of the mobile electronic device 110 shown in FIG. 4B are examples of the functional structures implemented in the mobile electronic device 110 according to execution of an application for a service according to an embodiment of the present disclosure, and components of the server 120 are an example of the functional structure for interacting with the functional structure of the mobile electronic device 110.

Referring to FIG. 4, the mobile electronic device 110 includes a content processing unit 461, a feed output unit 462, a widget output unit 463, a location estimation unit 464, and an advertisement control unit 465. The server 120 includes a tile manager 471, an album manager 472, an activity manager 473, a feed configuration unit 474, a widget control unit 475, and an advertisement providing unit 476.

The content processing unit 461 processes contents generated by the user or acquired externally in a format available in the tile widget, and then transmits the processed contents to the server 120. For example, the content processing unit 461 may transmit a picture that is taken by a user with a camera or that is stored, may transmit information on picture selection to configure an album, or may convert a comment or a reaction input by the user into data and transmit the data. In this case, the image is provided to the tile manager 471, the information on picture selection is provided to the album manager 472, and activity information (e.g., the comment, the reaction, etc.) of the user with respect to a posted picture is provided to the activity manager 473.

The tile manager 471 groups pictures provided from the content processing unit 461 to configure at least one tile, generates the at least one tile in a corresponding user's account, and manages the pictures based on tiles. Here, the tile is a set of pictures constituting a feed, and may be determined by a user's selection. The album manager 472 generates at least one album based on information on user selection provided from the content processing unit 461. The album is a group of pictures designated by a user among pictures included in at least one tile. That is, a single album may include pictures from different tiles. The activity manager 473 manages activity information of users. The activity information includes comments, reactions and so on that are input by the users on the feed. The activity information may be managed in units of the tiles, and may include the number of reaction(s) per type, a list of comment(s), and the like.

The feed configuration unit 474 configures an application screen, that is, feeds, by combining the pictures and the activity information managed by the tile manager 471 and the activity manager 473, and provides the application screen to the mobile electronic device 110. Each of the feeds may be configured based on the user's settings, and may include at least one of tile(s) of a corresponding user and tile(s) of other user(s). The feed output unit 462 displays the at least one feed on the display based on data provided from the feed configuration unit 474. The at least one feed includes tile(s) and interface items corresponding to the tile(s) (e.g., buttons, links, comment windows and so on).

The widget output unit 463 operates when a widget of the tile widget service is generated on a home screen. The widget output unit 463 displays a picture on the widget generated on the home screen. When generating the widget, the user may associate a specific tile with the widget, and picture(s) in the associated tile is displayed on the widget. To this end, the widget control unit 475 transmits picture(s) in the corresponding tile to the widget output unit 463.

The location estimation unit 464 provides information related to a location of the mobile electronic device 110 to the server 120. For example, the information related to the location may be location coordinates determined using a GPS or location-like information such as IP address. The information related to the location is provided to the advertisement providing unit 476.

The advertisement providing unit 476 generates advertisement contents to be output on the widget based on the location information and information related to the widget. Then, the advertisement providing unit 476 transmits advertisement contents to the advertisement control unit 465. Accordingly, the advertisement control unit 465 may provide advertisement contents to the widget output unit 463, and the widget output unit 463 may display the advertisement contents on the widget.

Figure 5:
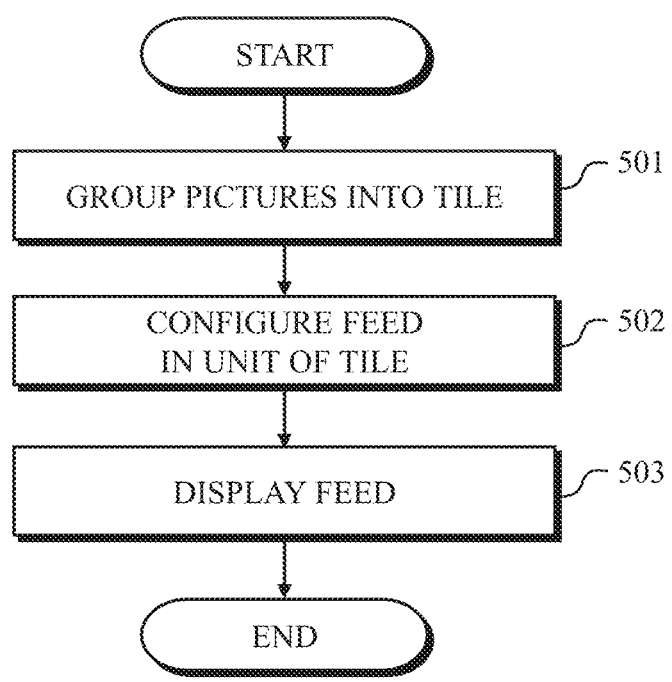
FIG. 5 illustrates a procedure for displaying a feed in a mobile electronic device according to an embodiment of the present disclosure.

FIG. 5 illustrates a procedure for displaying a feed in a mobile electronic device 100 according to an embodiment of the present disclosure.

Referring to FIG. 5, in step 501, the mobile electronic device 110 groups a plurality of pictures into tile(s). In this case, a plurality of tiles may be generated. Grouping of tiles may be performed based on data provided from a server. For example, referring to FIG. 6, a plurality of pictures such as picture #1-1, picture #1-2, and picture #1-3 are grouped with a first tile 610, and a plurality of pictures such as picture #2-1 and picture #2-2 and picture #2-3 may be grouped by the second tile 620.

Next, in step 502, the mobile electronic device 110 configures at least one feed in units of tiles. The feed(s) may include a plurality of posts, and each post includes pictures in one tile (e.g., the first tile 610 or the second tile 620). Here, the tile included in the feed(s) may include a user's own tile as well as the user's favorite tile among tiles of other users. In addition, the post may include various interface elements (e.g., a favorite icon, the number of views, the number of pictures, comments and so on).

Figure 6:
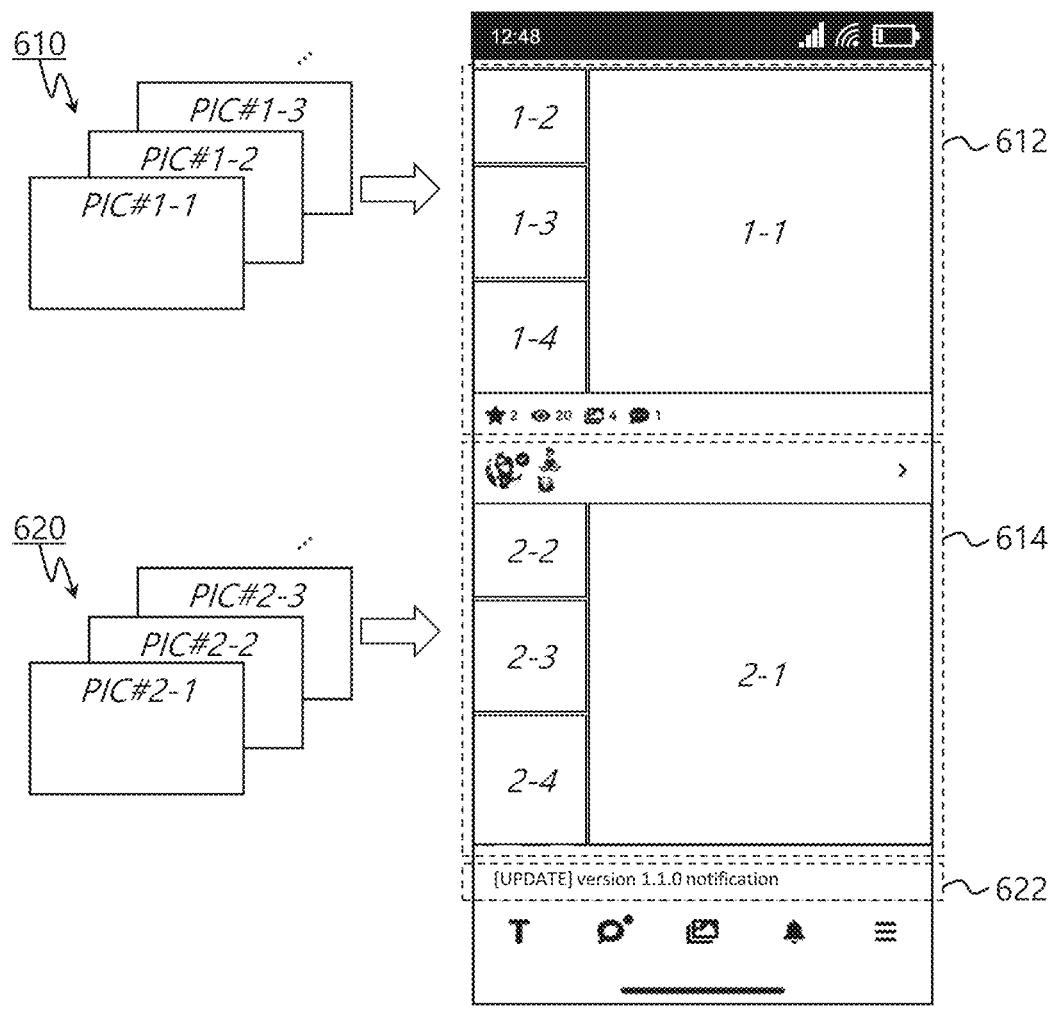
FIG. 6 illustrates an example of a feed displayed in a mobile electronic device according to an embodiment of the present disclosure.

Then, in step 503, the mobile electronic device 110 displays the at least one feed. The at least one feed may be expressed in a form in which a plurality of posts are arranged vertically. For example, as shown in FIG. 6, a first post 612 including pictures of the first tile 610 and a second post 614 including pictures of the second tile 620 are displayed, and a notification 622 may be displayed at a bottom. In this case, in each post, the pictures may not be displayed in an equal size, but may be displayed in various sizes. Referring to the example of FIG. 6, the first post 612 includes four pictures, with one picture being displayed larger on a right side and three pictures being displayed relatively small on a left side.

Figure 7:
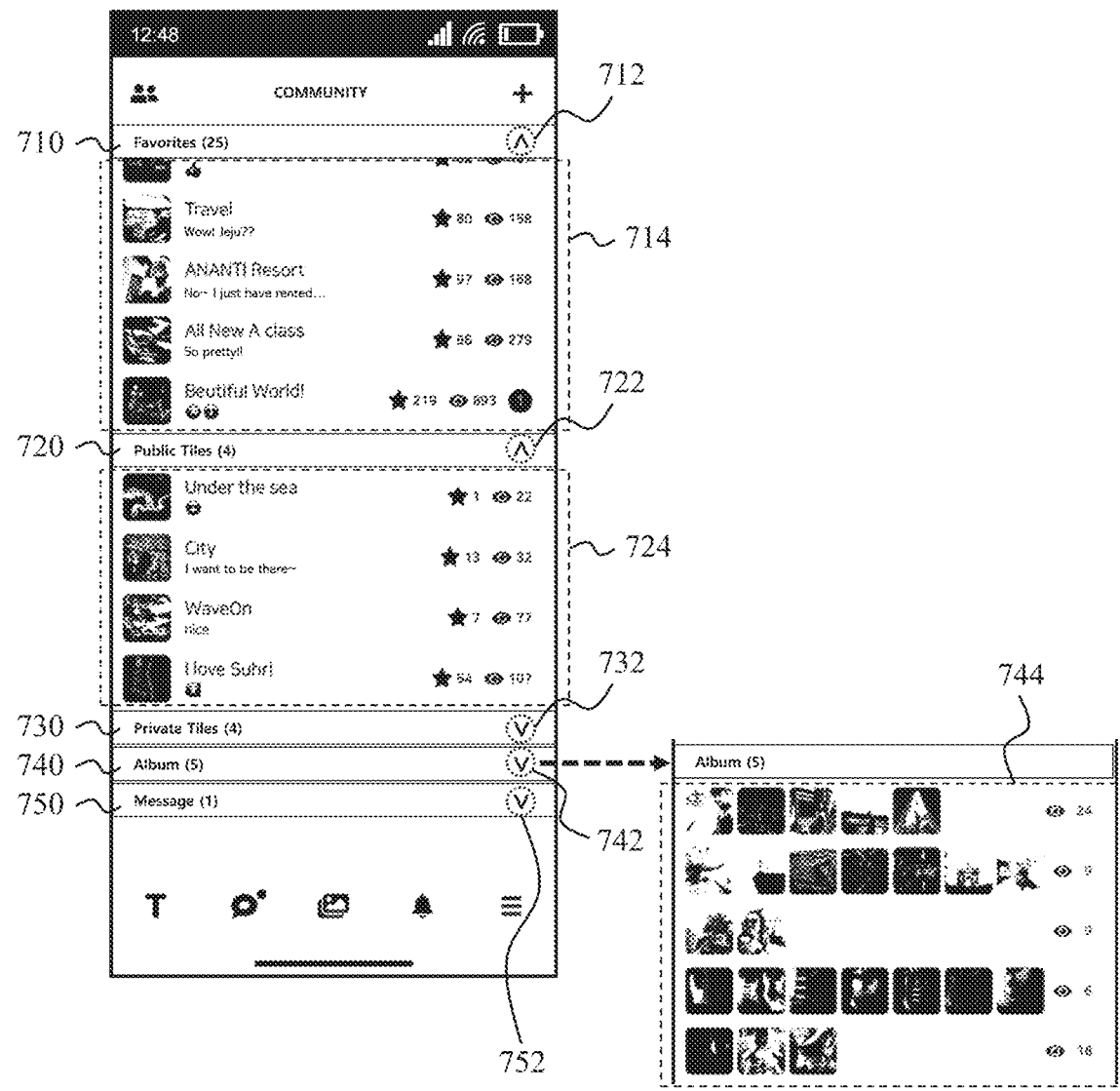
FIG. 7 illustrates an example of a community screen displayed on a mobile electronic device according to an embodiment of the present disclosure.

FIG. 7 illustrates an example of a community screen displayed on a mobile electronic device 110 according to an embodiment of the present disclosure. FIG. 7 illustrates a community screen including a plurality of items (e.g., favorites, public tiles, private tiles, albums, and messages). Referring to FIG. 7, the community screen includes a favorite bar 710, a public tile bar 720, a personal tile bar 730, an album bar 740, and a message bar 750.

The favorite bar 710 indicates a name of the item (e.g., 'Favorites') and the number (e.g., '25') of tiles included in the favorites on a left side, and includes a button 712 for opening/closing the favorites window on a right side. FIG. 7. exemplifies a state in which the favorites window 714 is opened. The favorites window 714 is displayed in a given size, and displays some of the tiles designated as favorites by dragging. Here, the favorite is an item showing tiles designated as favorites among tiles of other users, other than tiles generated by a corresponding user. Favorites are set by clicking on the Favorites icon (e.g., a star-shaped icon) on a tile displayed in another user's feed. The favorites window 714 lists a list of tiles set as favorites, and each item of the list of the tiles includes a representative picture, a title, a representative comment, the number of favorites, and the number of views.

The public tile bar 720 indicates a name of the item (e.g., 'public tile') and the number (e.g., '4') of tiles included in the public tiles on a left side, and includes a button 722 for opening/closing the public tile window on a right side. FIG. 7 exemplifies a state in which the public tile window 724 is opened. The public tile is a tile generated by a corresponding user, and includes a tile set to a public state where the tile is open to everyone. Tile(s) designated as a public tile are exposed to other users who have been set as friends through the main feed. Accordingly, the other users set as friends can view the tile designated as the public tile and can designate the tile as a favorite.

Private tile bar 730 indicates a name of the item on the left (e.g., 'Private tile') and the number (e.g., '4') of tiles included in the private tiles in a left side, and includes a button 732 for opening/closing a private tile window in a right side. Here, the private tile is a tile generated by a corresponding user, and includes a tile that is not set to the public state.

The album bar 740 indicates the name of the item (e.g., 'album') and the number of albums (e.g., '5') included in an album data on a left side, and includes a button 742 for opening/closing an album window on a right side. When the button 742 is clicked, a direction of an arrow in the button 742 is reversed, and an album window 744 is displayed. The album window 744 displays an album list generated by a user, and each item of the album list displays pictures included in the album and the number of views.

Similarly, the message bar 750 indicates a name of the item (e.g., 'message') and the number (e.g., '1') of stored messages on a left side, and includes a button 752 for opening/closing a message window on a right side.

Figure 8A:
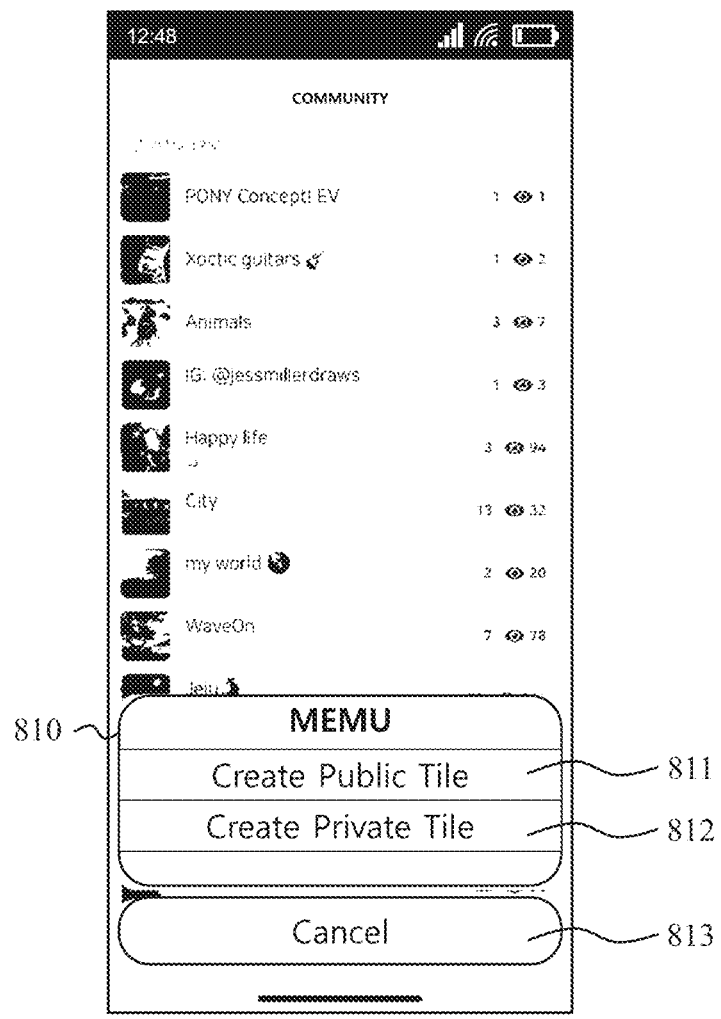
FIGS. 8A and 8B illustrate an example of an interface for generating a tile in a mobile electronic device according to an embodiment of the present disclosure.
Figure 8B:
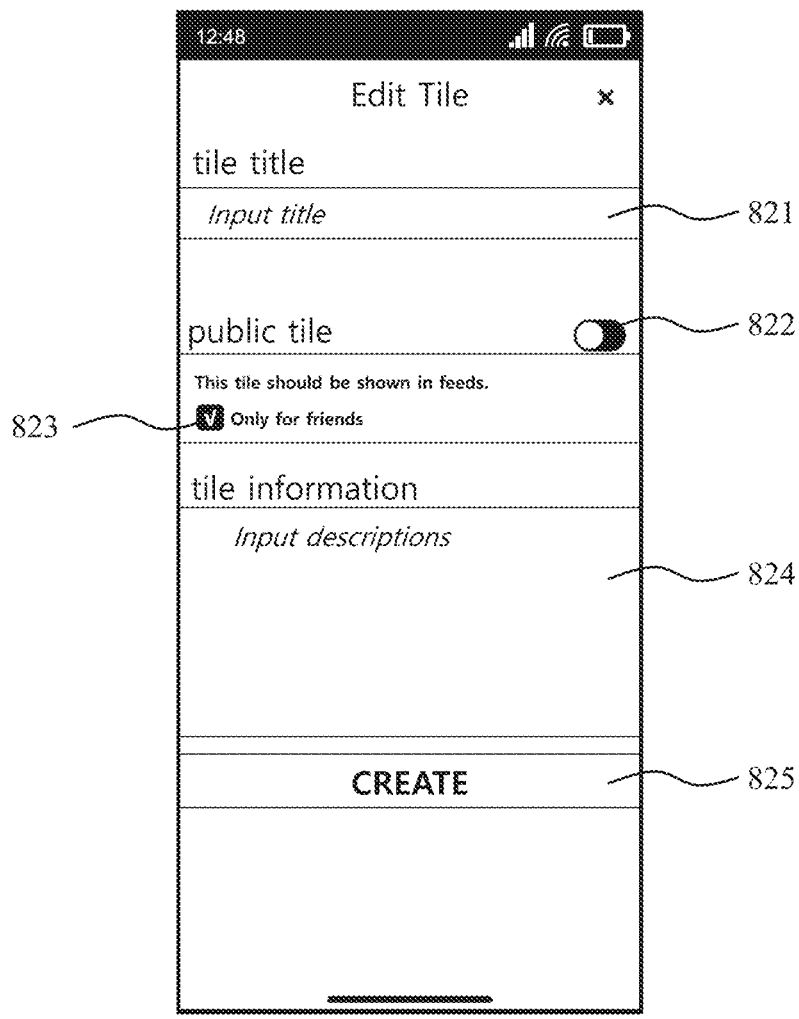

FIGS. 8A and 8B illustrate an example of an interface for generating a tile in a mobile electronic device 110 according to an embodiment of the present disclosure. FIGS. 8A and 8B illustrate screens displayed when a user generates a tile.

Referring to FIG. 8A, the tile adding menu 810 is overlapped on a community screen. The tile adding menu 810 includes a public tile creation button 811, a private tile creation button 812, and a cancel button 813. When the create public tile button 811 is clicked, a public tile creation screen is displayed. When the create private tile button 812 is clicked, a private tile creation screen is displayed. The cancel button 813 make to stop the tile creation operation and close the tile adding menu 810, when the cancel button 813 is the clicked.

When the create private tile button 812 is selected, a private tile creation screen as shown in FIG. 8B is displayed. Referring to FIG. 8B, the private tile creation screen includes a tile title input window 821, an on/off button 822, that is inactive, for setting as a public tile, a check box 823 for setting whether to be shown only to users set as friends, a content input window 824 and a create button 825 for generating a tile. When the on/off button 822 is clicked, an active state and the inactive state are toggled. In the case of FIG. 8B, the on/off button 822 is in the inactive state. When the create button 825 is clicked while the on/off button 822 is activated by a user's click, a public tile is created. That is, the public tile creation screen and the private tile creation screen may be switched according to a state of the on/off button 822.

Whether the generated tile is open to public is configured based on the state of the on/off button 822. Depending on whether the check box 823 is checked, whether the generated tile is shown only to user(s) set as a friend or to other users is configured. Text input to the tile title input window 821 and the content input window 824 is displayed together with the generated tile. When the create button 825 is clicked, a tile is generated according to information input into the tile title input window 821, the on/off button 822, the check box 823, and the content input window 824.

Figure 9:
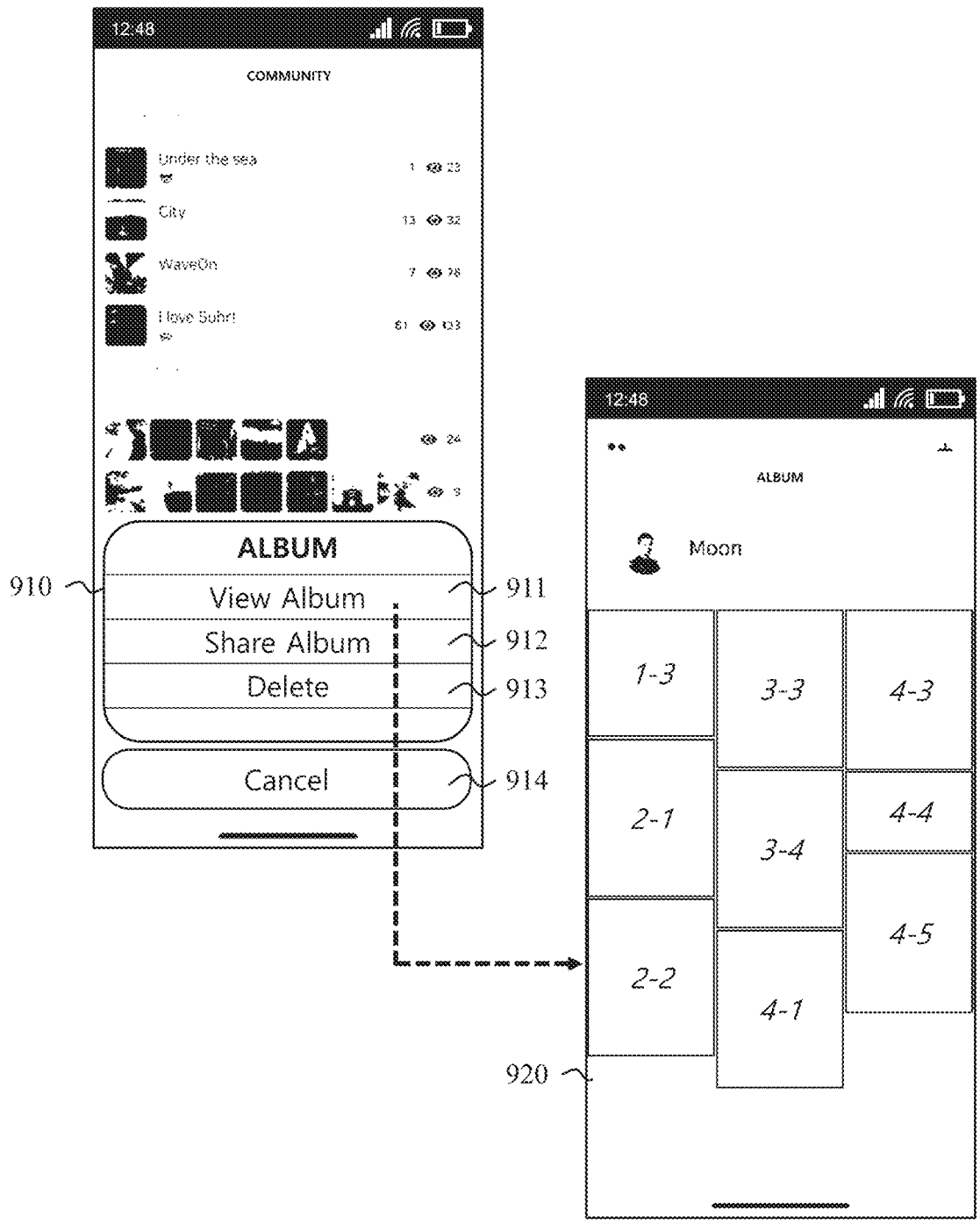
FIG. 9 illustrates an example of an interface for browsing an album in a mobile electronic device according to an embodiment of the present disclosure.

FIG. 9 illustrates an example of an interface for browsing an album in a mobile electronic device 110 according to an embodiment of the present disclosure. FIG. 9 illustrates screens that are displayed when a user browses an album.

Referring to FIG. 9, in response to selecting a specific album on a community screen, an album menu 910 is displayed and overlapped the community screen. The album menu 910 includes an album viewing button 911, an album sharing button 912, a deleting button 913, and a cancelling button 914. When the album viewing button 911 is clicked, the corresponding album 920 is displayed. The album 920 includes an author (i.e., an album holder) identifier (ID) and pictures included in the album. The album 920 may include pictures that are selected from the plurality of tiles, for example, a third picture of tile #1, a first picture of tile #2, a second picture of tile #2, a third picture of tile #3, and a third picture of tile #3, a fourth picture of tile #3, a first picture of the tile #4, a third picture of the tile #4, a fourth picture of the tile #4, and a fifth picture of the tile #4. When the album sharing button 912 is clicked, a screen for sharing a web URL of the album is displayed. When the deleting button 913 is clicked, the corresponding album is removed. When the cancelling button 914 is clicked, the album browsing procedure is finished, and the album menu 910 is closed.

As described above, the tile widget provides functions of managing and displaying pictures in units of tiles. Users can input reactions and write comments on tiles. In addition, the tile widget has a core function of displaying an album or a tile generated by users on a home screen by using the widget. If the widget of the tile widget is generated through the widget function provided by an operating system (OS), there is an advantage that pictures in the album or the tile can be periodically updated and viewed at a set time period (e.g., 15 minutes). When a user of the album or the tile related to the widget uploads a new picture, the new picture is displayed on the widget, without executing an application and directly viewing the album. In this way, the tile widget faithfully reflects a role of an online real-time album. operations for displaying pictures using the widget are described in FIG. 10.

Figure 10:
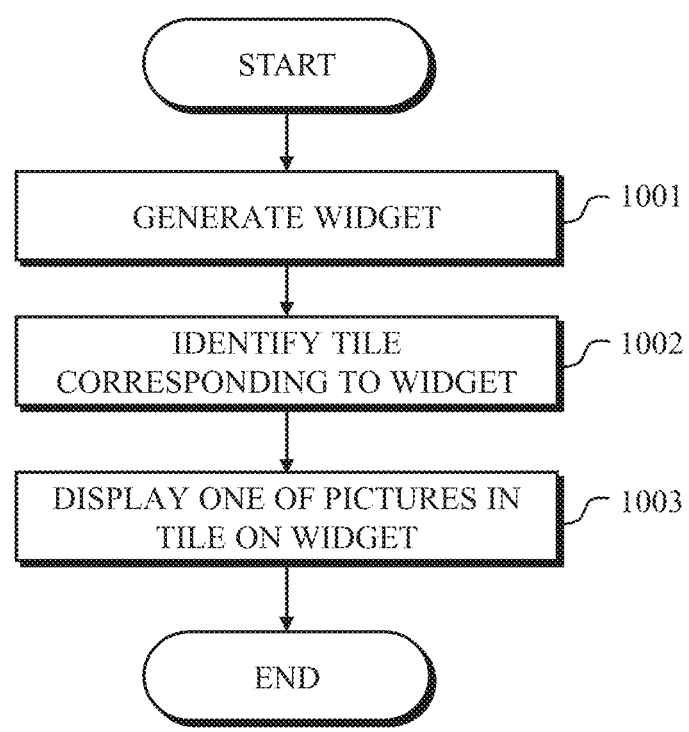
FIG. 10 illustrates a procedure for generating and displaying a widget in a mobile electronic device according to an embodiment of the present disclosure.

FIG. 10 illustrates a procedure for generating and displaying a widget in a mobile electronic device 110 according to an embodiment of the present disclosure.

Referring to FIG. 10, in step 1001, the mobile electronic device 110 generates a widget. The widget is generated (created) by a mechanism provided by an OS and the mechanism requires commands from a user. For example, if the user selects a tile widget application after an input for generating a widget (e.g., a pressing touch on a home screen background and selecting a widget menu), the mobile electronic device 110 may generate the widget for the tile widget. An interface for generating the widget will be described in more detail below with reference to FIG. 11.

Next, after generating the widget, in step 1002, the mobile electronic device 110 identifies a tile corresponding to the generated widget. Here, the tile is designated by the user when the user generates the widget. That is, the widget is associated with a single tile or a plurality of tiles.

Thereafter, in step 1003, the mobile electronic device 110 displays one of the pictures in the tile on the widget. When the at least one associated tile includes a plurality of pictures, the mobile electronic device 110 may select a picture to be displayed according to a predefined rule. According to another embodiment, the displayed picture may be selected and then indicated by the server 120 rather than the mobile electronic device 110.

The widget may be generated as shown in FIG. 10. The widget that may be generated according to an embodiment of the present disclosure may be classified into many types. The types of widgets are shown in Table 2 below.

When any one item included in the list 1120, that is, any one tile is selected, a detailed information window 1130 for the corresponding tile is displayed. Then, when the detailed information window 1130 is clicked, the corresponding tile is associated with the corresponding widget.

Figure 12A:
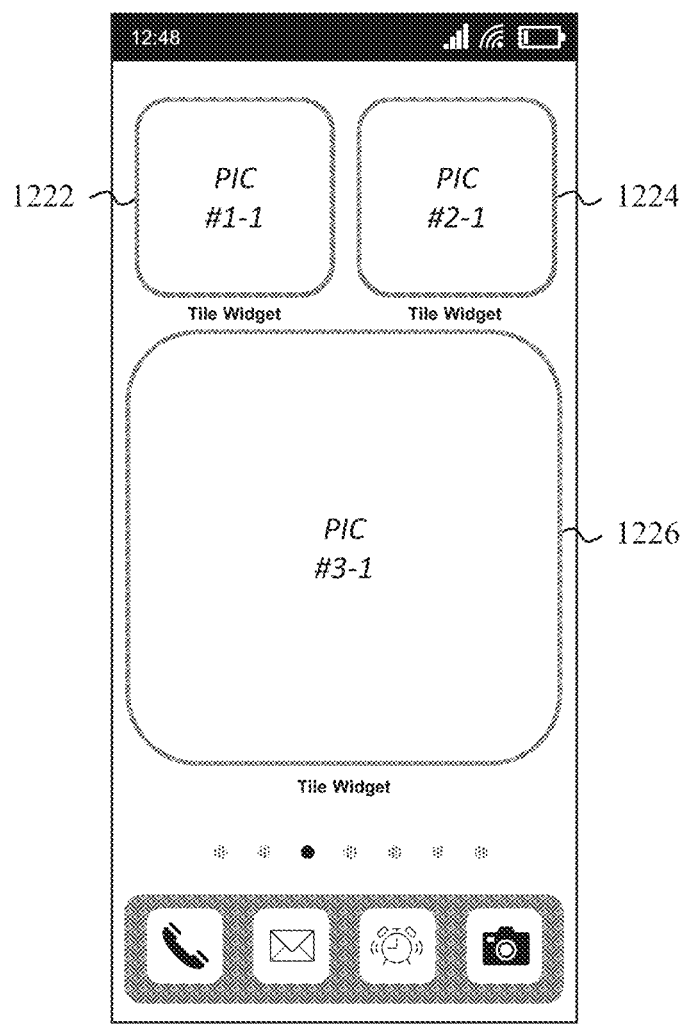
FIGS. 12A and 12B illustrate examples of widgets displayed in a mobile electronic device according to an embodiment of the present disclosure.
Figure 12B:
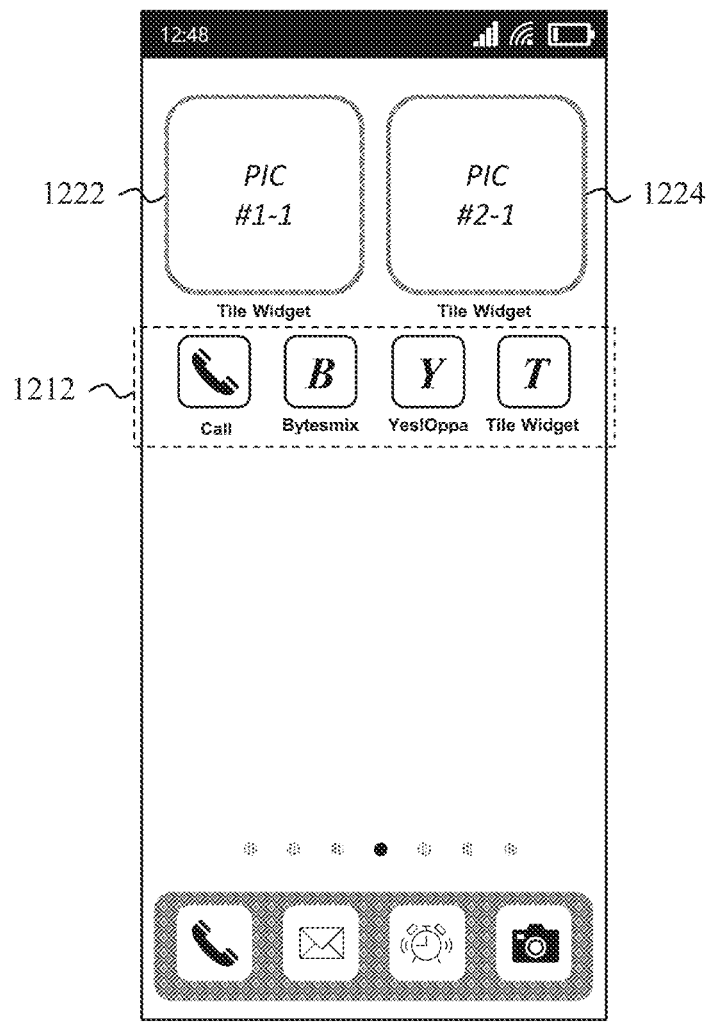

Examples in which a widget is generated and displayed are shown in FIGS. 12A and 12B. FIGS. 12A and 12B illustrate examples of widgets displayed in a mobile electronic device 110 according to an embodiment of the present disclosure.

Referring to FIG. 12A, three widgets 1202, 1204, and 1206 are generated on a home screen. In the example of FIG. 12A, a first widget 1202 is associated with a tile #1, and displays a picture #1-1. Similarly, a second widget 1204 and a third widget 1206 are associated with a tile #2 and a tile #3, respectively, to display a picture #2-1 and a picture #3-1. According to a user's setting, the third widget 1206 is set to be larger than the first widget 1202 and the second widget 1204. Since the three widgets 1202, 1204, and 1206 fill one page of the home screen, other icons are not shown.

FIG. 12B is an example in which widgets of the tile widget and icons of other applications are displayed together. The first widget 1202 and the second widget 1204 are disposed at a top, and icons 1212 are disposed at a bottom. As shown in FIG. 12B, the widgets of the tile widget may compose a page of the home screen together with the other icons.

Through the widgets shown in FIGS. 12A and 12B, the user can conveniently view pictures in designated tiles without executing an application. In this case, while the picture is displayed, a size of the widget may be changed by user's dragging a border of the widget. In this case, the mobile electronic device 110 may resize the picture being displayed on the widget to fit the size of the widget. Alternatively, the mobile electronic device 110 may maintain the size of the picture even if the size of the widget

TABLE 2

| type | Descriptions |
| --- | --- |
| clock | Displays a current time on a widget. This type displays a time with good visibility on a screen with a slightly larger size. |
| D-day | Displays the number of remaining days to D-Day based on a specific date. In such a way as '87th day' or '86th days', a user sets a travel date, an anniversary date and so on, and displays it on a widget. |
| anniversary | A function of advertisement of D-day function. This type is used to control the number of remaining days to one of a specific singer's concert date, a specific celebrity meetup date, any schedule date and so on according to an order of an advertiser, not a user. |

Figure 11:
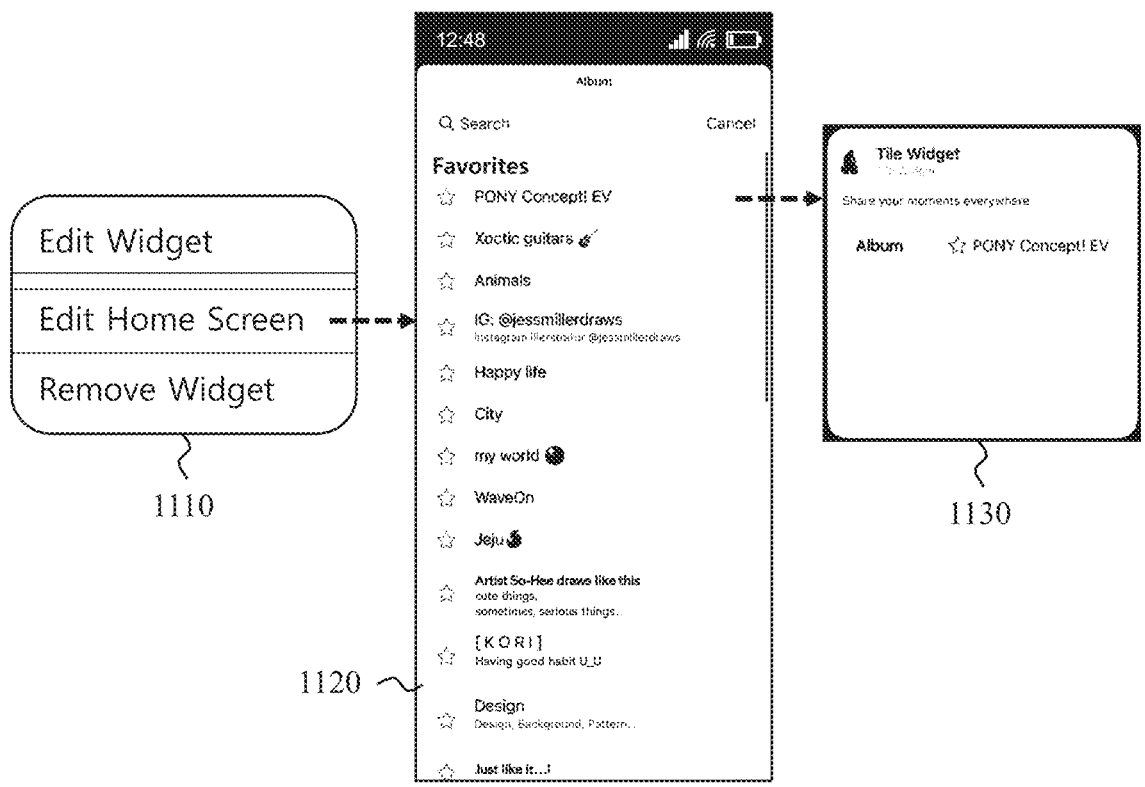
FIG. 11 illustrates an example of an interface for generating a widget in a mobile electronic device according to an embodiment of the present disclosure.

FIG. 11 illustrates an example of an interface for generating a widget in a mobile electronic device 110 according to an embodiment of the present disclosure. FIG. 11 illustrates an interface that is displayed when a user generates a widget of a tile widget service.

Referring to FIG. 11, when the widget of the tile widget service is generated on a home screen and the generated widget is selected, a tile widget menu 1110 is displayed and overlapped on the home screen. The tile widget menu 1110 includes a home screen editing button and a widget removing button. When the widget removing button is clicked, a corresponding widget is removed. When the home screen editing button is clicked, a list 1120 of tiles that can be displayed on a corresponding widget is displayed. For example, the list 1120 may include at least one of favorite tiles, public tiles, and private tiles. Each item included in the list 1120 includes a title of a tile and a description of the tile.

increases, and further display one or more other pictures within the same tile in a space obtained due to the increase in the size of the widget. In this case, the one or more other pictures may be displayed gradually larger as the size of the widget increases.

The picture displayed on the widget is not static and may be updated over time. An example in which the picture is updated is shown in FIG. 13A or FIG. 13B.

Figure 13A:
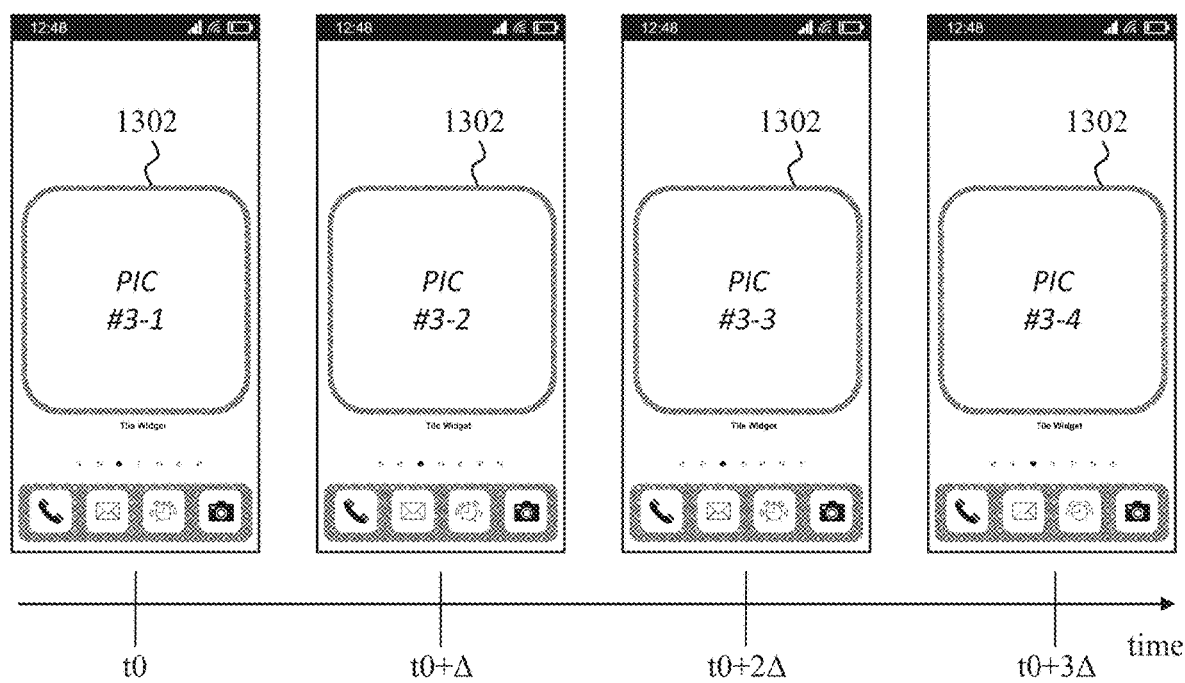
FIG. 13A illustrates an example of a change of pictures displayed through a widget over time in a mobile electronic device according to an embodiment of the present disclosure.

FIG. 13A illustrates an example of a change of pictures displayed through a widget over time in a mobile electronic device 110 according to an embodiment of the present disclosure. Referring to FIG. 13A, at time t0, a picture #3-1 is displayed on a widget 1302. Thereafter, as time passes through t0+Δ, t0+2Δ, and t0+3Δ, the pictures displayed on the widget 1302 change to a picture #3-2, a picture #3-3, and a picture #3-4. That is, the pictures included in the tile associated with the widget 1302 are sequentially displayed according to a predetermined time interval.

Figure 13B:
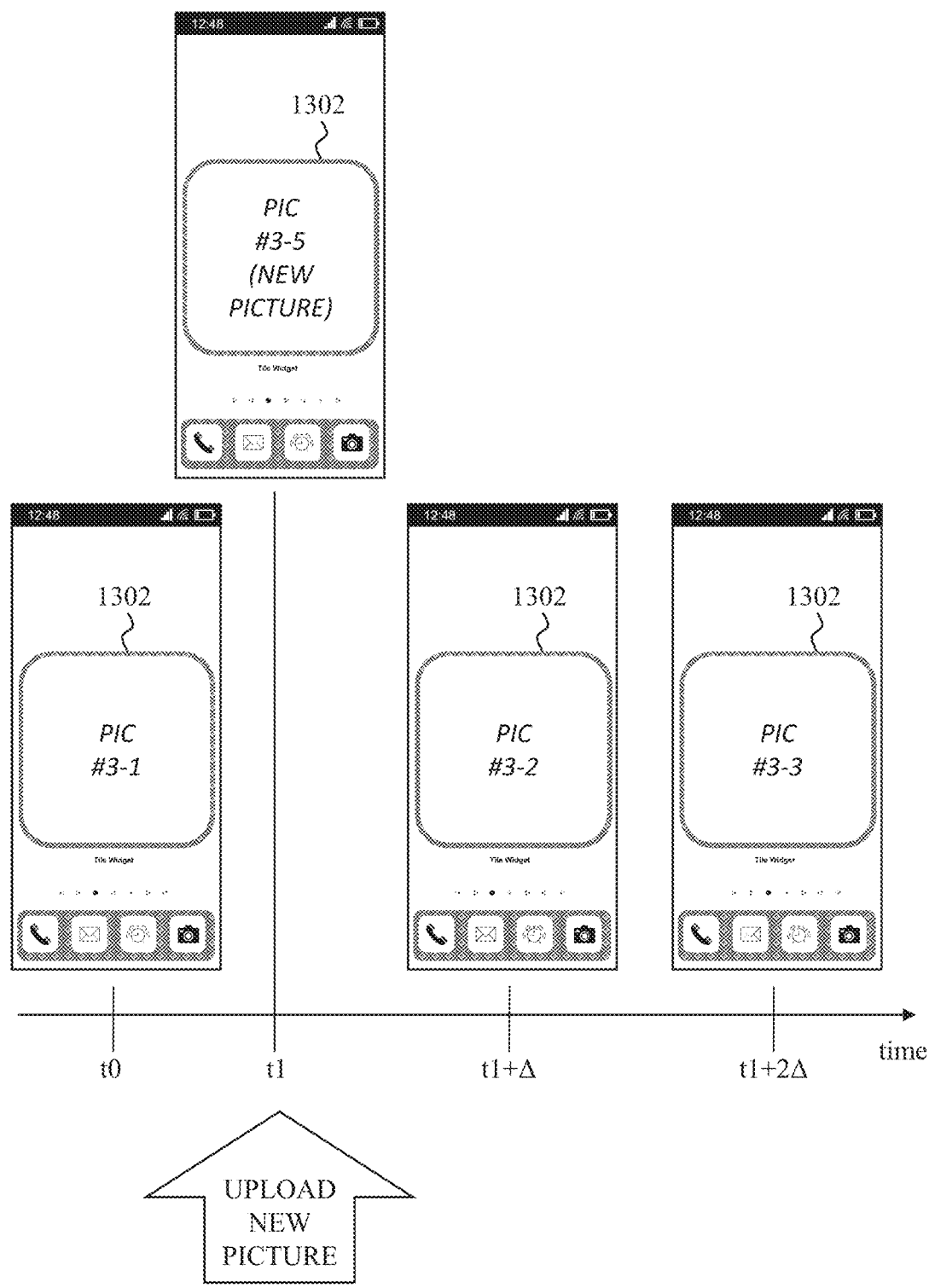
FIG. 13B illustrates another example of a change of pictures displayed through a widget over time in a mobile electronic device according to an embodiment of the present disclosure.

FIG. 13B illustrates another example of a change of pictures displayed through a widget over time in a mobile electronic device 110 according to an embodiment of the present disclosure. Referring to FIG. 13B, at time t0, the picture #3-1 is displayed on the widget 1302. Then, at time t1, a new picture is additionally uploaded to the tile associated with the widget 1302. Accordingly, regardless of a lapse of the predetermined time, at time t1, the picture displayed on the widget 1302 is changed to a picture #3-5, which is the new picture. Thereafter, according to the predetermined time interval Δ, at times t1+Δ and t1+2Δ, the picture displayed on the widget 1302 sequentially change to the picture #3-2 and the picture #3-3. That is, due to the upload of the new picture, a time offset of the picture display is reset. However, according to another embodiment of the present disclosure, even if a new picture is displayed in a middle of a procedure, the update time of the next picture may still be determined based on t0.

Figure 14:
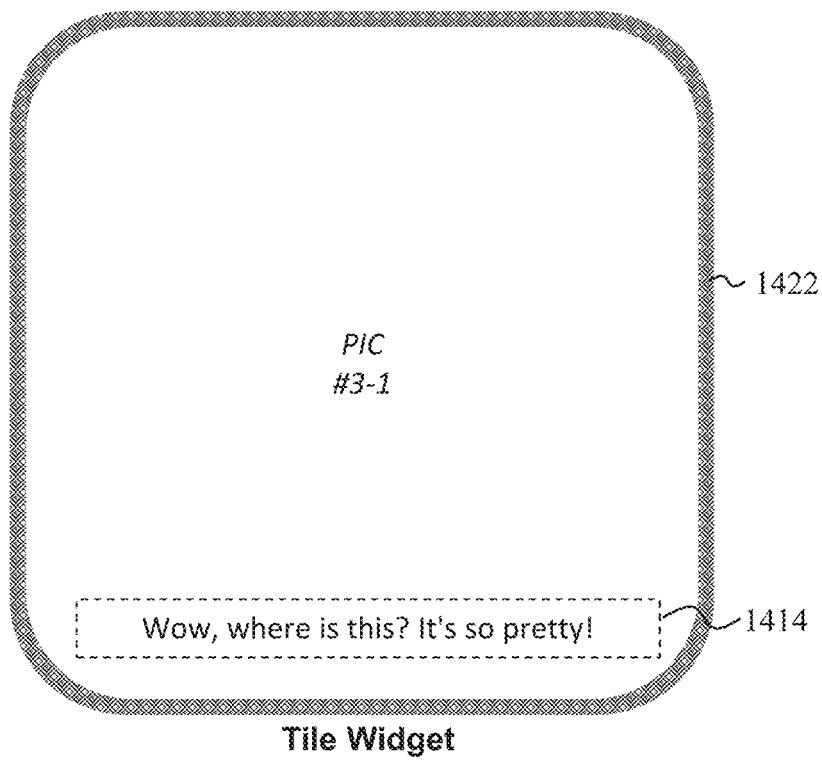
FIG. 14 illustrates an example of a comment displayed on a widget in a mobile electronic device according to an embodiment of the present disclosure.

The widget can display not only a picture, but also comments related to the picture or a corresponding tile. That is, if there is a comment on the picture, the tile widget provides a tool through which users can communicate by displaying the user's comments in a single line at a bottom of the widget. An example in which comments are displayed is illustrated in FIG. 14. FIG. 14 illustrates an example of a comment displayed on a widget in a mobile electronic device 110 according to an embodiment of the present disclosure. Referring to FIG. 14, picture #3-1 is displayed on a widget 1402. Further, at a bottom of an inner area of the widget 1402, overlaid with the picture, a comment 1414 with contents of "Wow, where is this? It's so pretty!" is displayed. The comment 1414 is input by a user with respect to the picture or the tile, it may be shown in an album displayed by executing an application. In this way, the tile widget allows to identify comments from the widget on a home screen without executing the application.

As described above, the tile widget is a unique album service that may provide an online album through widgets. Furthermore, according to various embodiments of the present disclosure, the tile widget provides a function of exposing advertisements of companies through the widgets located on the home screen. The tile widget provides a function to determine a location of a user currently being serviced (e.g., a country, a city or a state such as Seoul, Gyeonggi and so on) based on the location of the user and an IP address and so on. Additionally, the tile widget may analyze user preferences based on information such as albums and picture favorites. By using the analyzed result, the tile widget may periodically transmit advertisements to users through the widget.

Accordingly, the advertisements of the companies may be exposed through the widget at a certain period or by an event triggering rule. When a user clicks on the widget that is sending the advertisement, various responses may be provided, for example, being redirected to a web page for the advertisement or providing an event promotion by using an application for the company. The advertisement may include dynamic contents such as a D-day advertisement (e.g., a new car launch, a celebrity birthday, a travel itinerary and so on) rather than in a form of a simple image.

Figure 15:
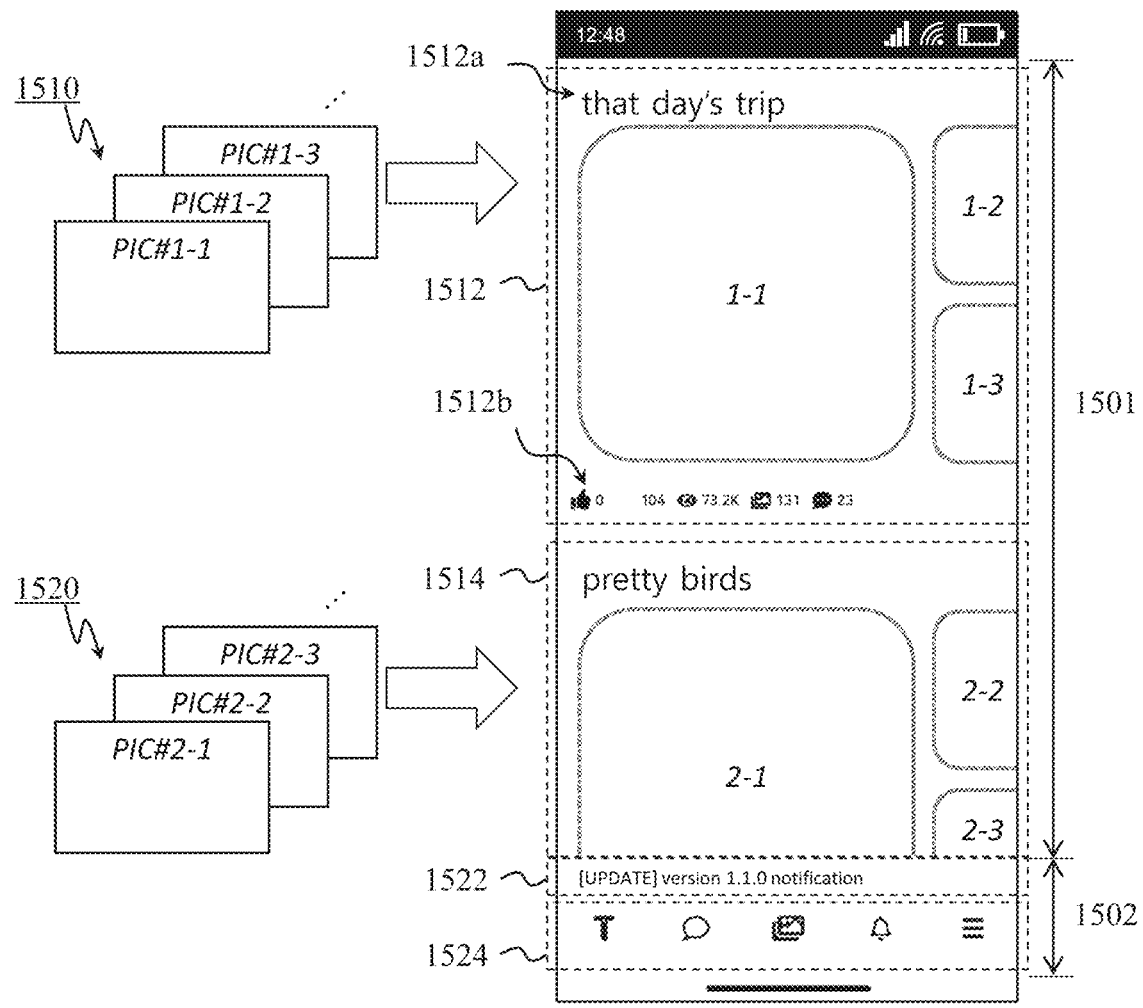
FIG. 15 illustrates an example of feeds displayed in a mobile electronic device according to an embodiment of the present disclosure.

As described above, the mobile electronic device 110 displays feeds. The feeds may be arranged vertically on a screen. For example, as shown in FIG. 15, the screen is divided into a feed area 1501 and a menu area 1502, a first feed 1512 including pictures of a first tile 1510 and a second feed 1514 including pictures of a second tile 1520 may be displayed in the feed area 1510, and a notice 1522 and a tap bar 1524 may be displayed in the menu area 1502. According to another embodiment, the notice 1522 may be omitted. In this case, in each post, the pictures may not be displayed in a uniform size, but may be displayed in various sizes. Referring to the example of FIG. 15, the first feed 1512 includes three pictures, and one picture is largely displayed on a left, and two pictures are displayed relatively small on a right. In addition, the first feed 1512 may further include at least one of a title item 1512a (e.g., "that day's trip") of the tile at a top and an activity information item 1512b at a bottom.

As described with reference to FIG. 15, the pictures included in one tile are configured and displayed as one feed. In displaying the feed, as in the example of FIG. 15, some pictures may be partially displayed. In this case, according to an embodiment, an entire area of the picture that is partially displayed may be displayed according to a user input. To this end, a structure of the feed may be designed as shown in FIG. 16A below.

Figure 16A:
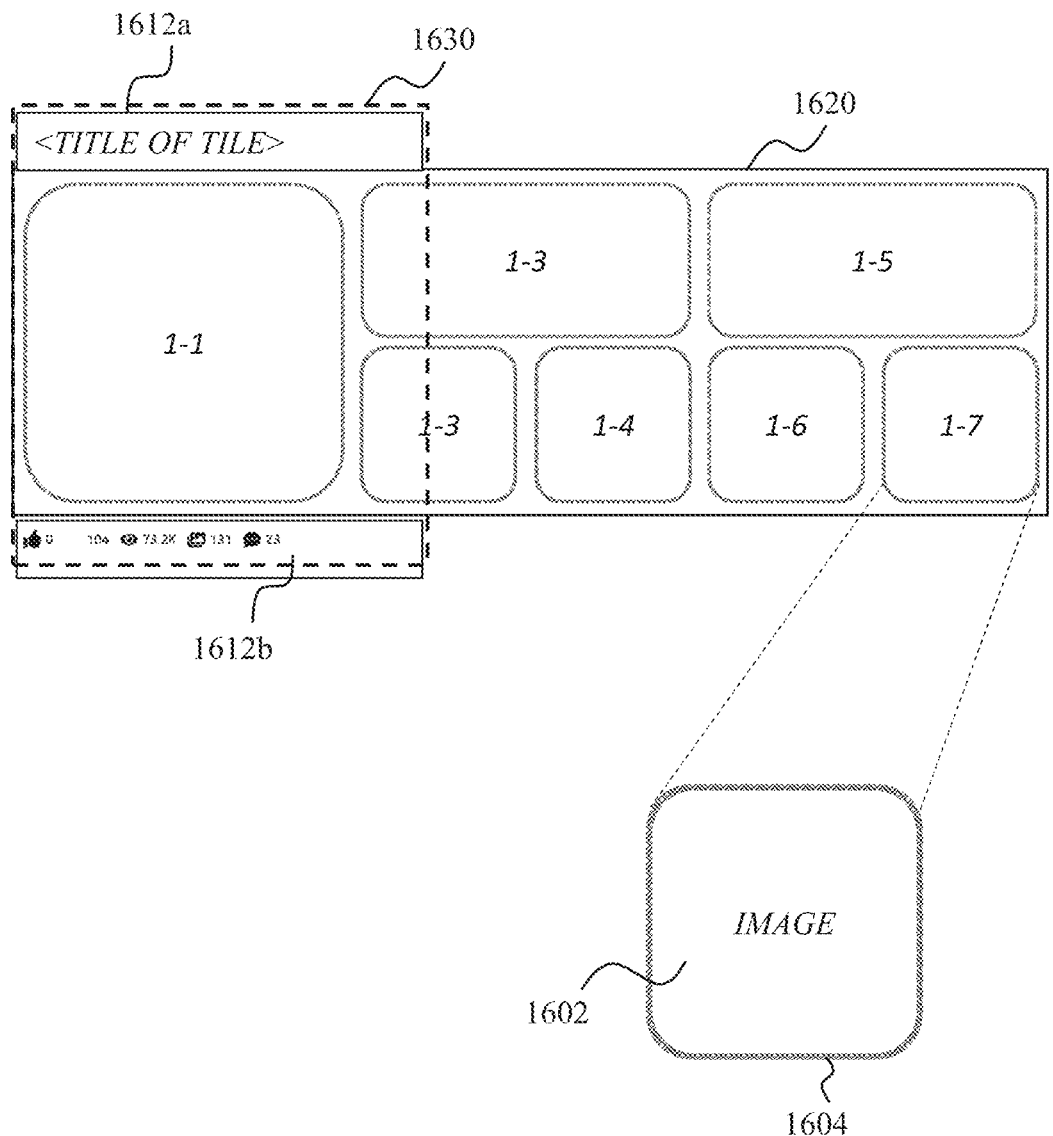
FIG. 16A illustrates a structure of a feed in a mobile electronic device according to an embodiment of the present disclosure.

FIG. 16A illustrates a structure of a feed in a mobile electronic device according to an embodiment of the present disclosure. Referring to FIG. 16A, the feed includes a board 1620 including pictures of a tile (e.g., pictures #1-1 to #1-7), a title item 1612a representing a title of the tile, and an activity information item 1612b related to the feed.

The board 1620 is a bundle of contents in which the pictures that may be displayed through the feed are arranged according to a predetermined layout. Here, the layout may be predefined in a client application or may be instructed by a server (e.g., the server 120 of FIG. 1). According to an embodiment, the layout applied to the board 1620 represents each of the pictures in one of sizes, and represents the pictures in a processed shape, not an original shape as it is.

For example, as in the example of FIG. 16A, the pictures in the board 1620 may be arranged in three sizes. Specifically, a first size (e.g., the size applied to picture #1-1), that is largest size, a second size (e.g., a size applied to picture #1-2), that is medium one, and a third size (e.g., the size applied to picture #1-2), that is smallest, may be applied to each picture. Also, each picture is displayed in a shape where a border is modified. In other words, as in the example of FIG. 16A, each picture is displayed in a shape in which a border 1604 having rounded corners is added to an outside of the image 1602, rather than an original shape of a square image. In this case, a color of the border 1640 may be fixed to one or configured to various colors. According to various embodiments, different colors may be applied to the border 1604 per feed, or different colors may be applied to the border 1604 per picture within one feed.

A window 1630 specifies an area (hereinafter, 'display area') of the board 1620 displayed in the feed. The window 1630 has a height (i.e., a length of a vertical axis) that is greater than the board 1620, but has a width (i.e., a length of a horizontal axis) that is smaller than the board 1620. Accordingly, at a point in time, only a portion but not all of the board 1620 may be displayed in the feed. According to various embodiments, as the window 1630 or the board 1620 slides left and right, the display area may be controlled. A process of changing the display area will be described in more detail below with reference to FIG. 16C.

The title item 1612a includes the title of the tile. The title of the tile is text information specified by the user who uploaded the tile. The activity information item 1612b includes a like icon, a favorite icon, a view icon, a picture icon, and a comment icon, and further includes numerical values indicating the number of likes, the number of favorites, the number of views, the number of pictures and the number of comments next to each icon. According to other embodiments, at least one of the above five icons may be omitted or another type of icon may be added.

As described with reference to FIG. 16A, the pictures may be seen to the feed in the processed shape and the various sizes. Here, the shape and the sizes reflect an expression format of the widget generated on a home screen. In other words, the mobile electronic device applies the expression applied to the picture displayed on the widget generated on the home screen to the picture displayed in the feed. Accordingly, the user can check in advance, in the feed, how each picture will be expressed in the widget of the home screen when the widget is generated. That is, the user should preview a shape of the widget to be generated on the home screen by scrolling left and right using the pictures in the tile while the application is running.

Figure 16B:
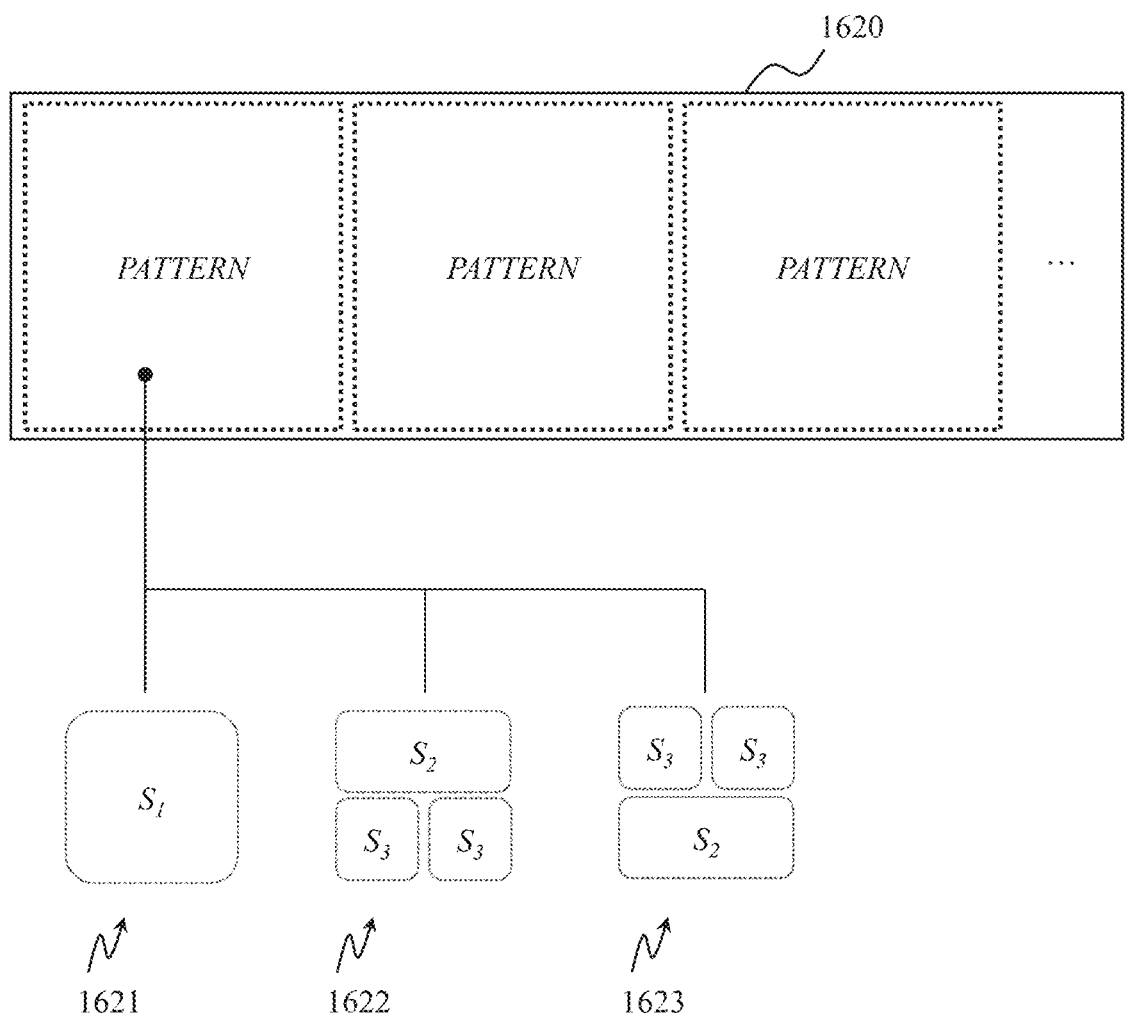
FIG. 16B illustrates examples of picture patterns constituting a board in a mobile electronic device according to an embodiment of the present disclosure.

The expression of the widgets that may be generated on the home screen, that is, the shape and the size depend on an operating system (OS). Specifically, the shape, the size, and an aspect ratio (e.g., a ratio of width and height) of the widget on the home screen may be limited. Since a dynamic range of the size and the aspect ratio of a picture uploaded by the user is relatively wide, when the picture is displayed through the widget on the home screen, the picture may be expressed differently from an original image. Accordingly, by displaying the pictures in a state in which the format and the size of the widget are reflected in advance in the feed as in the above-described embodiment, the mobile electronic device may increase the predictability of the user. That is, the size and the shape of the pictures included in the board 1620 described with reference to FIG. 16A is not a simple selection, but a result of reflecting the expression of the widget, and provide an effect of allowing the user to experience content display through the widget in advance FIG. 16B illustrates examples of picture patterns constituting a board in a mobile electronic device according to an embodiment of the present disclosure. FIG. 16B exemplifies patterns for arranging pictures in board 1620.

Referring to FIG. 16B, the pictures in the board 1620 are arranged according to a combination of patterns, and candidate patterns 1621, 1622, and 1623 that may be used as each pattern are defined. A first candidate pattern 1621 includes one picture of the largest size S1. A second candidate pattern 1622 includes one picture of the medium size S2 at a top and two pictures of the smallest size S3 at a bottom. A third candidate pattern 1623 includes two pictures of the smallest size S3 at the top and one picture of the medium size S2 at the bottom. At least one of the three candidate patterns 1621, 1622 and 1623 may be applied to the board 1620.

According to an embodiment, the first candidate pattern 1621 and the second candidate pattern 1622 may be alternately applied to the board 1620. With respect to some feeds, the first candidate pattern 1621 may be applied to the leftmost side of the board 1620, followed by the second candidate pattern 1622. With respect to other feeds, the second candidate pattern 1621 may be applied to the leftmost side of the board 1620, followed by the second candidate pattern 1622. One of an arrangement of the order of the first candidate pattern 1621—the second candidate pattern 1622 and an arrangement of the order of the second candidate pattern 1622—the first candidate pattern 1621 may be randomly applied based on a randomization algorithm. In addition to this, the candidate patterns 1621, 1622, and 1623 may be applied in various combinations.

In FIG. 16B, a size of a unit region defining the pattern is exemplified to be identical as the size S1. However, it is also possible to understand that the size of the unit region defining the pattern is twice the size S1. In this case, at least a part of the nine patterns that can be designed by combining two of the three candidate patterns 1621, 1622, and 1623 illustrated in FIG. 16B may be defined as usable patterns. Furthermore, a pattern in which pictures of the size S1 are arranged on a left and a right of picture(s) of size S2 may also be defined.

Figure 16C:
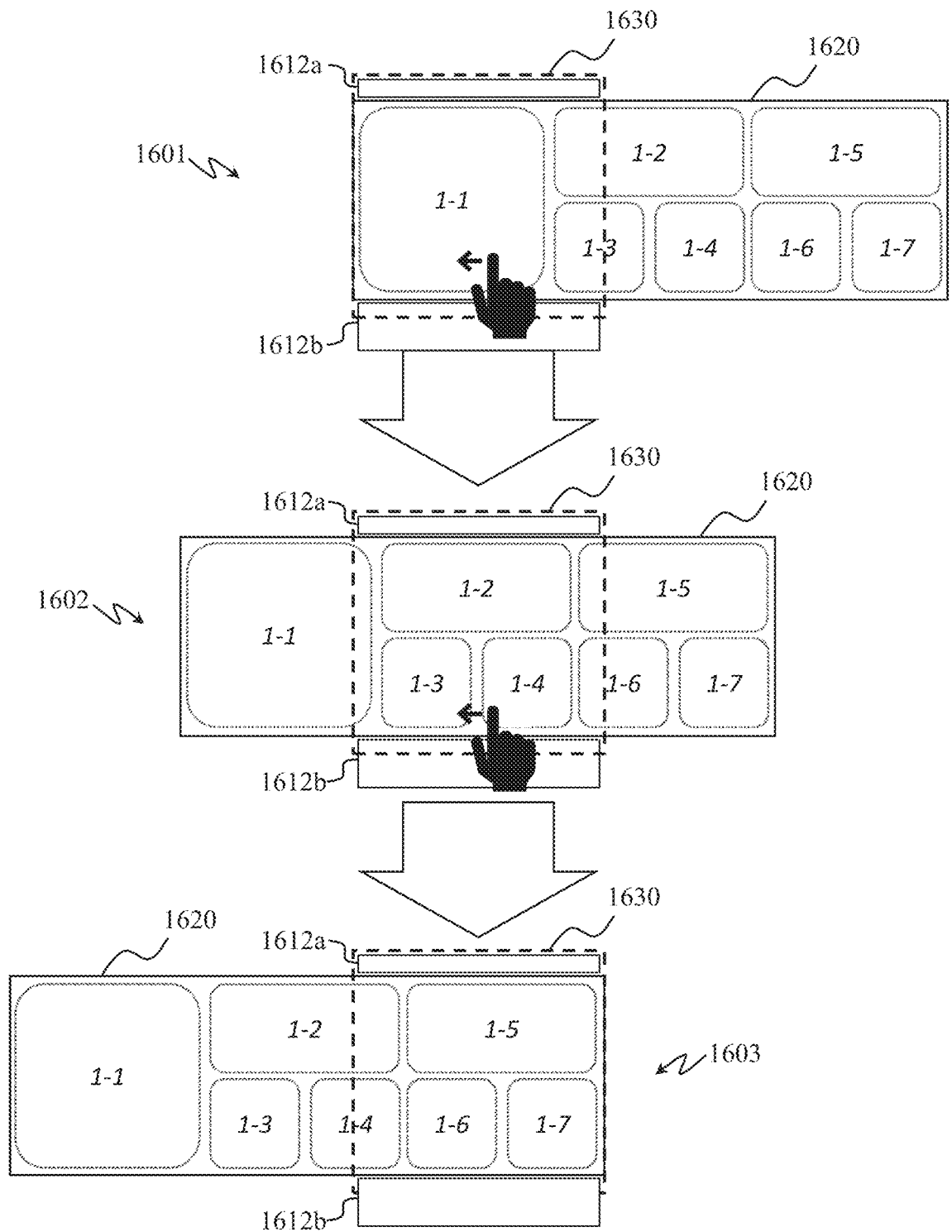
FIG. 16C illustrates controlling a display area by a swipe in a mobile electronic device according to an embodiment of the present disclosure.

FIG. 16C illustrates controlling a display area by a swipe in a mobile electronic device according to an embodiment of the present disclosure.

Referring to FIG. 16C, the board 1620 is displayed to the user through the window 1630. A relative positional relationship between the board 1620 and the window 1630 may change. However, although not shown in FIG. 16C, the title item 1612a and the activity information item 1612b are fixed on the window 1630. The size of the board 1620 is larger than the size of the window 1630, and thus the window 1630 can cover only a part of the board 1620. That is, only a partial area covered by the window 1630 among an entire area of the board 1620 is displayed.

Accordingly, if the relative positional relationship between the board 1620 and the window 1630 is changed, the display area may be changed. In other words, if the area covered by the window 1630 changes as the position of the window 1630 on the board 1620 changes, the display area is changed. The relative position of the window 1630 with respect to the board 1620 may be controlled by a user's touch input, specifically, a left and right swipe touch input.

In the case of a first state 1601 of FIG. 16C, since the window 1630 is located at the left end of the board 1620, a left end area covered by the window 1630 is displayed. This may be understood as an indication of the first feed 1512 illustrated in FIG. 15. The first state 1620 in which the left end area of the board 1620 is displayed may be an initial state of the feed.

In the first state 1601, when a swipe touch input from right to left occurs on the board 1620, as in the second state 1602, the board 1620 moves to the left that is same to a direction of the swipe touch input. Accordingly, as in the second state 1602, the window 1630 covers a right of the left end area of the board 1620. This may be understood as equivalent to moving the window 1630 relatively to a right. Accordingly, the partial area of the board 1620 displayed on the screen is changed to a middle area of the board 1620. In this case, an amount of movement of the board 1620 may be determined based on at least one of a movement distance of a touch point through the left and right swipe touch input, a movement speed of the left and right swipe touch input, and a touch release time of the left and right swipe touch input.

In the second state 1602, when a right-to-left swipe touch input occurs again on the board 1620, as in the third state 1603, the board 1620 moves to the left that is same to a direction of the swipe touch input. Accordingly, as in the third state 1603, the window 1630 covers a right end area of the board 1620. This may be understood as equivalent to moving the window 1630 relatively to the right. Accordingly, the partial area of the board 1620 displayed on the screen is changed to the right end area of the feed. In this case, the amount of movement of the board 1620 may be determined based on at least one of a movement distance of the touch point through the left and right swipe touch input, a movement speed of the left and right swipe touch input, and a touch release time of the left and right swipe touch input.

In the embodiment described with reference to FIG. 16C, in the first state 1601 which is the initial state, the display area 1630 covers entire of picture #1-1, a part of the picture #1-2, and a part of the picture #1-3. Accordingly, in the first state 1601, the entire of picture #1-1 is displayed, and the parts of the picture #1-2 and picture #1-3 is displayed. As the parts of the pictures #1-2 and #1-3 are displayed in the initial state, the user may recognize that there are more viewable pictures through the left and right swipe touch input. That is, by configuring the layout so that a boundary of the display area 1630 is laid over the middle of some pictures in the initial state, an effect occurs to allow the user to intuitively recognize that pictures not covered in a current display area 1630 (i.e., blocked pictures), can be viewed by the left and right swiping touch input.

Figure 17:
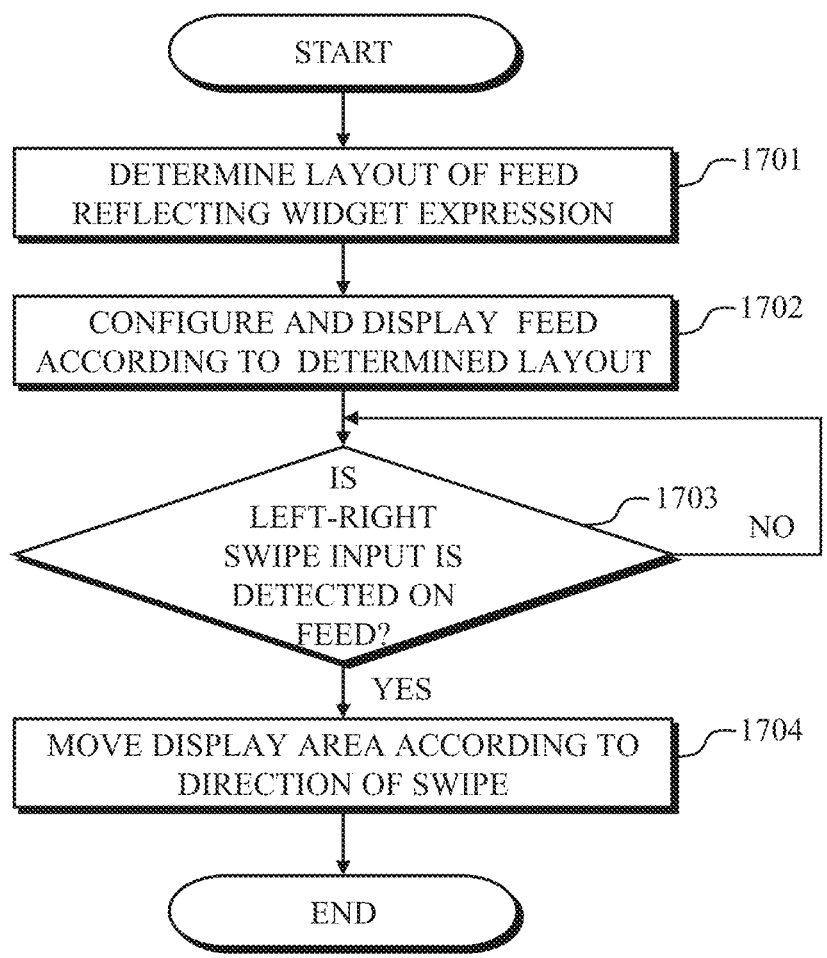
FIG. 17 illustrates a procedure for moving a display area for a feed in a mobile electronic device according to an embodiment of the present disclosure.

FIG. 17 illustrates a procedure for moving a display area for a feed in a mobile electronic device 110 according to an embodiment of the present disclosure.

Referring to FIG. 17, in step 1701, the mobile electronic device 110 determines a layout of the feed reflecting a widget expression. That is, the mobile electronic device 110 determines the number of pictures included in the feed, sizes and arrangement of the pictures, and a shape of each picture. Here, the determined size of each picture is one of sizes supported by the home screen widget, and the shape of each picture (e.g., a border shape of the picture) may be the same as a shape of the home screen widget. For example, the mobile electronic device 110 may determine the arrangement of pictures by combining a plurality of candidate patterns as shown in FIG. 16B.

In step 1702, the mobile electronic device 110 configures and displays the feed according to the determined layout. Specifically, the mobile electronic device 110 selects the determined number of pictures from a tile, allocates the selected pictures to each location in the layout, and crops or resizes each picture according to a size applied to the assigned location, modifies the shape of each picture (e.g., the border shape) into the widget expression, arranges the pictures, and display the pictures along with other components of the feed (e.g., a tile title, activity information and so on). In this case, a specific operation for cropping or resizing the pictures may vary according to various embodiments. At this time, according to the initial state of the feed, the display area is located at the left end area of the board.

In step 1703, the mobile electronic device 110 identifies whether a left and right swipe input is detected on the feed. That is, the mobile electronic device 110 identifies whether a user's touch input to change the display area of the board occurs on the feed.

If the left and right swipe input is detected, in step 1704, the mobile electronic device 110 moves the display area according to the direction of the swipe. Specifically, the mobile electronic device 110 detects a start point of the swipe input, a moving direction of the touch point, a moving speed of the touch point, release of the touch and so on in real time, and moves the display area according to a result of the detection. In this case, the display area may be moved opposite to the direction of the swipe input. In other words, in a state in which the window is fixed, the board may be moved in the direction of the swipe input.

According to an embodiment, while the touch input is maintained, the display area may be moved by a left and right movement distance of the touch point. When the touch is released, the display area may be maintained if the touch movement speed at a release time of the touch or during a time period before the release time is less than a threshold value. In this case, the display area is maintained even if at least one picture spans the boundary of the window. On the other hand, if the touch movement speed at the release time of the touch or during the time period before the release time is equal to or greater than the threshold value, the display area may be moved further in proportion to the corresponding movement speed.

In the embodiment described with reference to FIG. 17, the mobile electronic device determines the layout of the feed. Herein, the layout includes the number of pictures, the size of each picture, the location of each picture, the shape of each picture, and the like. Since the feed according to an embodiment of the present disclosure expresses each picture in one of a plurality of sizes, the mobile electronic device must determine a displayed size (hereinafter, 'output size') of each picture to be included in the feed.

According to an embodiment, an output size of each of the pictures may depend on an order of the output sizes included in the determined pattern combination. The output sizes used in the feed are determined by the combination of patterns as described with reference to FIG. 16B. Meanwhile, pictures in a feed belong to a tile, and each picture has a unique identifier within the tile. Accordingly, the mobile electronic device may determine the output sizes of the pictures in the order of the identifier according to the order (e.g., S1→S2→S3→S3 or S2→S3→S3→S1) determined by the determined pattern combination (e.g., the output size of the picture ID #1 is S1, the output size of the picture ID #2 is S2, the output size of the picture ID #3 is S3, and the output size of the picture ID #4 is S3). In this case, an order in which the pictures are arranged in the feed is based on the identifier order.

According to another embodiment, the output size of each of the pictures may be determined based on an original size and an original aspect ratio of the picture. In this case, the mobile electronic device determines the pictures to be included in the feed, and then classifies the pictures by available output sizes based on the original size and the original aspect ratio of the pictures. For example, when three output sizes are available as shown in FIG. 16B, the mobile electronic device applies size S2 to pictures having a relatively large original ratio of a vertical length to a horizontal length, applies size S1 to pictures having a relatively large original size among the remaining pictures, and applies size S3 to rest of the remaining pictures. In this case, the order in which pictures are arranged in the feed may not follow the identifier order.

According to further another embodiment, the output size of each of the pictures may be indicated by the server. In this case, the mobile electronic device may determine the output size of each picture based on information indicated by the server, that is, information received from the server. That is, the server indicates to the mobile electronic device in which output size the pictures to be included in the feed are displayed. In this case, an operation, by the server, of determining the output size of each of the pictures is required, and the server may determine the output size similarly to the above-described embodiments.

In the embodiment described with reference to FIG. 17, the picture downloaded from the server may be cropped or resized to be included in the feed. In other words, the mobile electronic device may reduce the number of pixels or cut off a part of the downloaded picture to have the size displayed in the feed. According to various embodiments, the operation of at least one of cropping and resizing may be performed based on at least one of the size of the picture, the aspect ratio of the picture, and the characteristic of the picture.

According to an embodiment, at least one of cropping and resizing may be performed so that a displayed range of the downloaded picture is maximized. For example, the mobile electronic device may resize the picture based on a length of the vertical axis or a horizontal axis of the selected size, and then crop the resized picture to fit the selected size. For example, when it is desired to display a picture of size W1×H1 (W1<H1) downloaded from the server in size D×D (D<W1), the mobile electronic device may resize the picture such that the horizontal size of the picture to be D while maintaining the aspect ratio of the picture, and then may crop the resized picture to D×D size. Here, if a length of a short axis of the downloaded picture is identical to a length of a long axis of the size displayed in the feed, resizing may be omitted.

According to another embodiment, the cropping or the resizing may be performed so that a meaningful part of the picture is properly expressed. Specifically, the mobile electronic device may crop the pictures to include a main part of the picture, and may resize the cropped result to fit a displayed size. Here, the main part may be defined in various ways. For example, the mobile electronic device may identify at least one main subject and crop the pictures such that an area not including the identified at least one main subject is excluded. The identification of the main subject may be based on artificial intelligence-based recognition technology. As another example, the mobile electronic device may divide the picture into a plurality of regions, select a main region based on statistical information on pixel values in each region, and crop the picture to include the main region. In this case, the classification of the main region may be performed only on one axis of the picture or may be performed on both the vertical axis and the horizontal axis.

As a specific example, the cropping may be performed so that a main subject (e.g., a person's face) is included in a cropped result. To this end, the mobile electronic device may detect a main region including a main subject in the picture and determine a cropped region so that the main region and the cropped region overlap as much as possible. For example, the cropped region may be determined such that the centers of both the main region and the cropped region (e.g., a center line of a horizontal axis, a center line of a vertical axis, or a center point in consideration of both of the horizontal and the vertical axes) coincide with each other. In particular, a crop function in consideration of a main region may be useful to a size S2 in which the horizontal length is greater than the vertical length. Accordingly, according to an embodiment, the mobile electronic device may consider the region of the main subject when cropping to arrange the picture with the output size S2, and may not consider the range of the main subject when arranging the picture with another output size. However, according to another embodiment, it is also possible to consider the range of the main subject for all output sizes.

As in the embodiment described with reference to FIG. 17, the mobile electronic device may resize and crop the picture. However, according to another embodiment, resizing may be performed by a server and cropping may be performed by a client. In this case, the server provides the resized picture to the client, and the client, that is, the mobile electronic device, may crop the downloaded picture according to a selected pattern. According to another embodiment, both of the resizing and the cropping may be performed in the server. That is, in this case, the mobile electronic device may display the downloaded picture without performing the resizing and the cropping.

As described above, in case that a tile includes a plurality of pictures, the mobile electronic device may include the plurality of pictures in the feed and display the plurality of pictures and move the display area in response to a user input. In an initial state of the feed, all pictures included in the tile may not be included in the feed. In this case, the mobile electronic device may add at least some of the remaining pictures to the feed in response to an additional user input. This function may be referred to as an 'expansion' of the feed. The expansion may also be referred as 'view more', 'adding pictures' and so on. The concept of the expansion function is as shown in FIGS. 18A and 18B below.

Figure 18A:
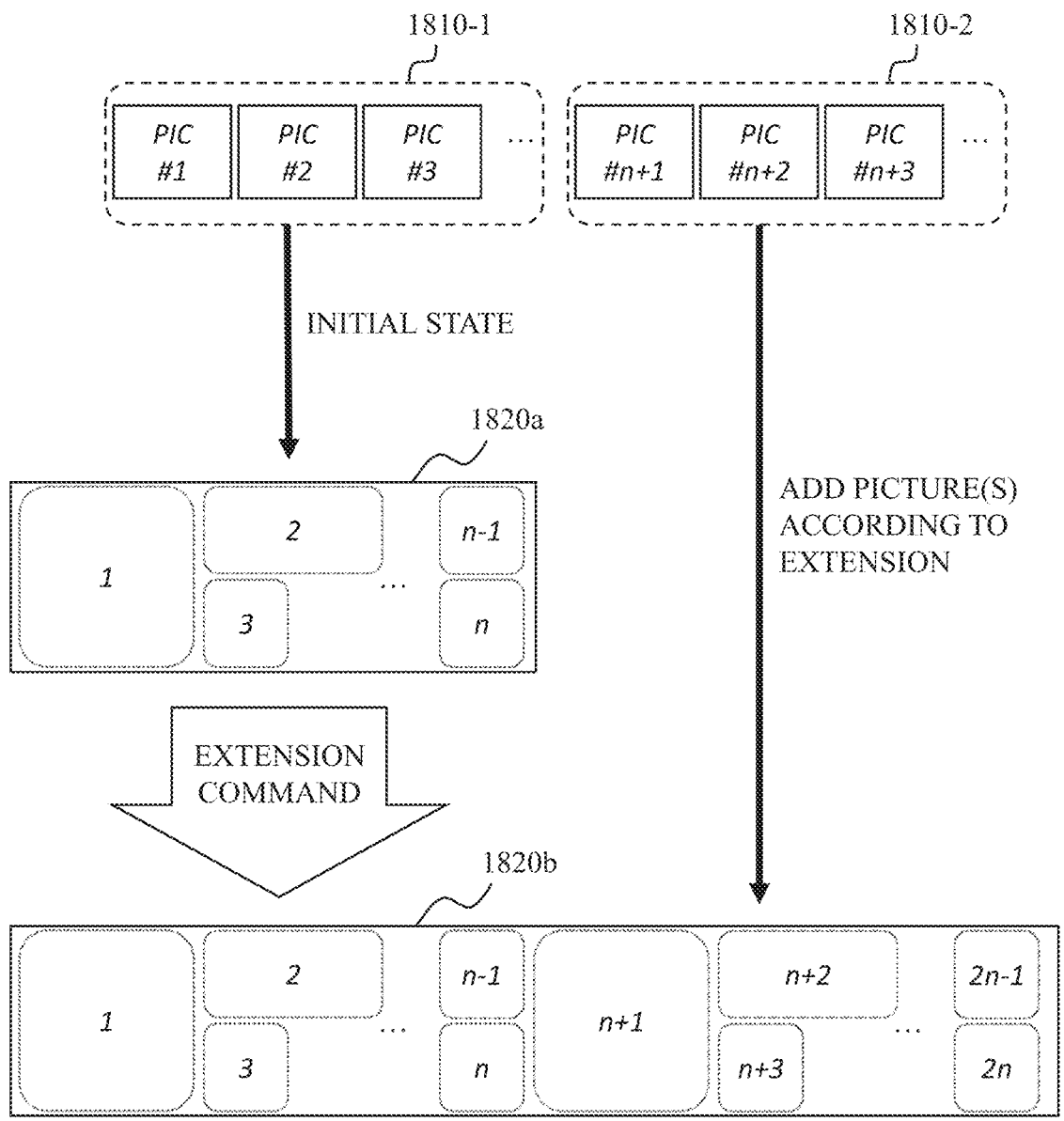
FIG. 18A illustrates a concept of feed expansion in a mobile electronic device according to an embodiment of the present disclosure.
Figure 18B:
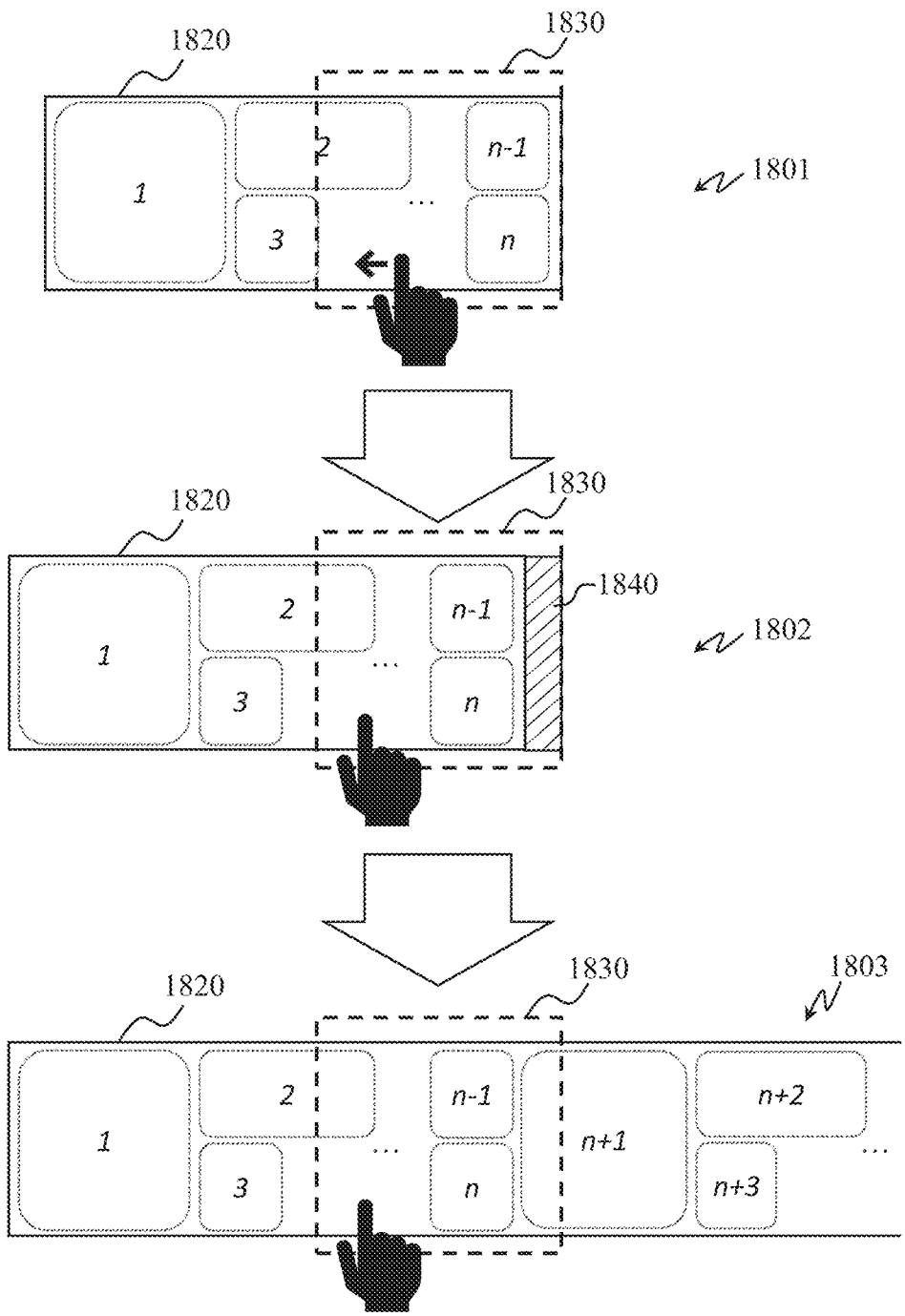
FIG. 18B illustrates an example of an extension command with respect to a feed in a mobile electronic device according to an embodiment of the present disclosure.

FIG. 18A illustrates a concept of feed expansion in a mobile electronic device according to an embodiment of the present disclosure. Referring to FIG. 18A, a tile corresponding to a feed includes a plurality of pictures. The plurality of pictures is divided into a plurality of subsets. The subsets include a first subset 1810-1 and a second subset 1810-2. In the example of FIG. 18A, each of the first subset 1810-1 and the second subset 1810-2 includes n different pictures.

In an initial state of the feed, an initial board 1820*a* is generated to contain the pictures in the first subset 1810-1. That is, the initial board 1820*a* in the initial state includes n pictures, such as pictures #1 to #n. At least some of the pictures #1 to #n included in the initial board 1820*a* should be displayed in the feed, and the mobile electronic device displays the pictures #1 to #n when the display area is moved in response to the user's left and right swipe input.

At this time, when a user's extension command occurs, the pictures in the second subset 1810-2 are added to the initial board 1820*a*. Accordingly, the extended board 1820*b* includes 2n pictures, such as pictures #1 to #2n. At least some of the pictures #1 to #2n included in the extended board 1820*b* will be displayed in the feed, and the mobile electronic device displays the pictures #1 to #2n when the display area is moved in response to the user's left and right swipe input. In the example of FIG. 18A, the pictures #n+1 to #2n added to the extended board 1820*b* are arranged in the same pattern as the pictures #1 to #n. However, according to another embodiment, the pictures #n+1 to pictures #2n may be arranged in different patterns from pictures #1 to #n.

The expansion command may be defined as a user input of a specific pattern. For example, the expansion command may be defined based on a user's touch input. According to an embodiment, an icon for an extension command may exist. According to another embodiment, the expansion command may be defined as a swipe input. An example of an expansion command defined as the swipe input is shown in FIG. 18B below.

FIG. 18B illustrates an example of an extension command with respect to a feed in a mobile electronic device according to an embodiment of the present disclosure. FIG. 18B is an example of a case that a swipe touch input to a left direction is used as the extension command in a state where the display area is located at the right end area of the board.

Referring to FIG. 18B, in a first state 1801, a display area 1830 is located at a right end area of the board 1820. In this case, the board 1820 can no longer be moved to a left. In this case, a swipe touch input of the user toward the left direction occurs within the display area.

In response to this, as in a second state 1820, the board 1810 moves to the left by a predetermined distance, and a blank area 1840 is displayed on a right side of the display area 1830. Here, the blank area 1840 may be filled with a color that is identical to or different from a background of the board 1820. According to an embodiment, a notification for announcing the expansion may be displayed in the blank area 1840. At this time, after the blank area 1840 is displayed. If the user does not release the touch input or does not swipe right, the second state 1802 is maintained.

If the second state 1802 is maintained during a time period more than a threshold time, like a third state 1803, the board 1820 is updated such that pictures is added. Accordingly, the board 1820 is extended to the right, and pictures (e.g., picture #n+1, picture #n+2, picture #n+3 and so on) are added to the board 1820. Thereafter, although not shown in FIG. 18B, if a swipe touch input in the left direction occurs, the board 1820 moves, and the picture #n+1, picture #n+2, picture #n+3 and so on are displayed on the display area 1830.

As described above, the tile widget service according to embodiments of the present disclosure may provide various user interface/user experience (UI/UX) based on the widget, such as providing content through the widget and providing the feed reflecting the widget expression. In particular, as aforementioned, the tile widget service may arrange feeds in a vertical direction (i.e., an up-down direction), and each feed may be configured to be long in a horizontal direction (i.e., a left-right direction). Accordingly, the user may retrieve the feeds by swiping up and down on screen, and may retrieve pictures in the feed by swiping left and right on the feed. The retrieving of the feeds is shown in FIG. 19 below.

Figure 19:
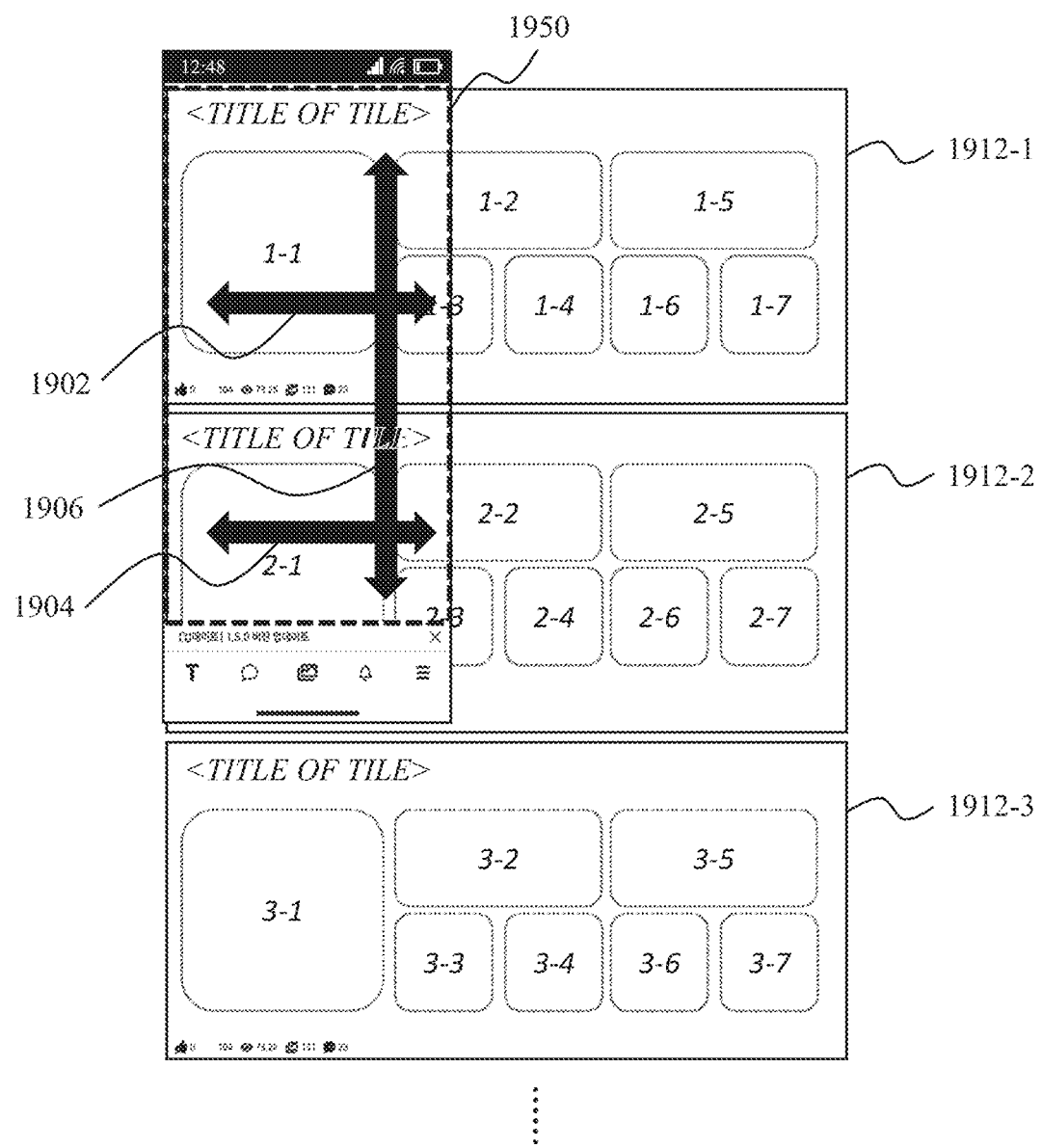
FIG. 19 illustrates a concept of retrieving feeds by a swipe input in a mobile electronic device according to an embodiment of the present disclosure.

FIG. 19 illustrates a concept of retrieving feeds by a swipe input in a mobile electronic device according to an embodiment of the present disclosure. Referring to FIG. 19, a plurality of feeds such as a first feed 1912-1, a second feed 1912-2, and a third feed 1912-3 have been generated, and an area 1950 displayed on an application screen is a part of a plurality of feeds. In a state as shown in FIG. 19, the area 1950 displayed may be moved by a swipe touch input within the area 1950. For example, if a vertical swipe input occurs within the area 1950, the feeds move up or down at the same time, so that the area 1950 may relatively move down or up. Also, if a left and right swipe input occurs within the area 1950, a board in a feed to which the touch point of the swipe input belongs is moved left or right, and thus another part of the board may enter the area 1950. Specifically, if the swipe touch input 1902 occurs, a board of the first feed 1912-1 is moved left or right. Similarly, if the swipe touch input 1904 occurs, a board of the second feed 1912-2 is moved left or right. And, if a swipe touch input 1906 occurs, a plurality of feeds such as the first feed 1912-1, the second feed 1912-2, and the third feed 1912-3 are all moved up or down.

Figure 20:
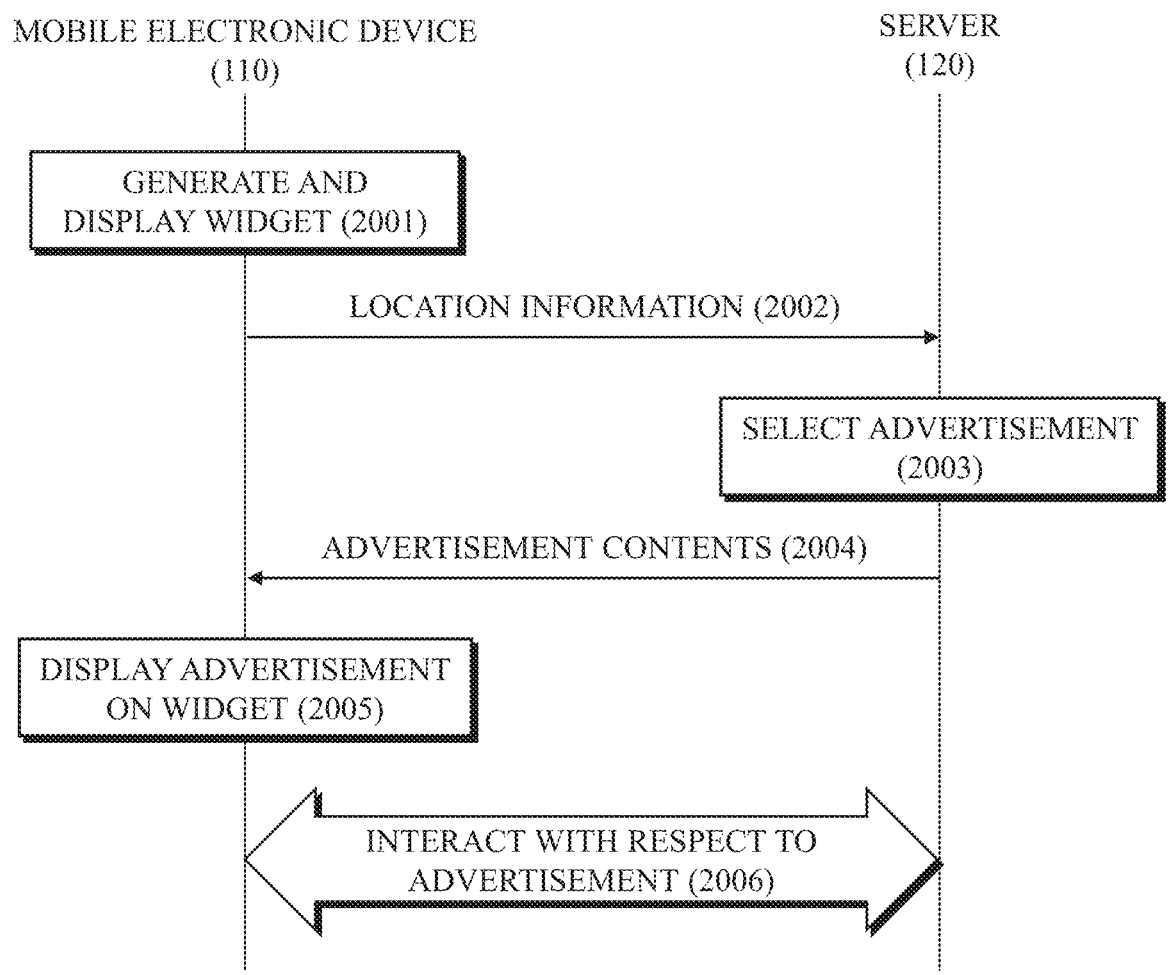
FIG. 20 illustrates a procedure for displaying an advertisement in a system according to an embodiment of the present disclosure.

FIG. 20 illustrates a procedure for displaying an advertisement in a system according to an embodiment of the present disclosure. FIG. 20 exemplifies operations of the mobile electronic device 110 and the server 120.

Referring to FIG. 20, in step 2001, the mobile electronic device 110 generates and displays a widget. For example, the mobile electronic device 110 may display the widget as described with reference to FIGS. 10 to 14.

In step 2002, the mobile electronic device 110 transmits location information to the server 120. The location information may be replaced with an IP address. If the IP address is replaced with the IP address, there is no operation of separately transmitting the IP address, and the server 120 may obtain IP address from a packet received from the mobile electronic device 110.

In step 2003, the server 120 selects advertisement contents to be provided to the mobile electronic device 110. In this case, the server 120 may determine a location of the mobile electronic device 110 based on the location information or the IP address, and select the advertisement contents based on the location. Also, in addition to the location, the server 120 may select the advertisement contents based on one or more pictures displayed on the widget of the mobile electronic device 110 and a result of analyzing the user's preference of the mobile electronic device 110.

In step 2004, the server 120 transmits the advertisement contents to the mobile electronic device 110. In this case, data containing advertisement content (e.g., image, video and so on) may be transmitted, or information for accessing data (e.g., uniform resource locator (URL) information) may be transmitted.

In step 2005, the mobile electronic device 110 receiving the advertisement contents displays the advertisement contents in the widget. The advertisement contents may be displayed as soon as the reception, or may be displayed after a display period arrives. In addition, the mobile electronic device 110 may display the advertisement contents by replacing the picture in an entire of the widget, or may display the advertisement contents in a part of the widget and the picture in the remaining part of the widget. In this case, the mobile electronic device 110 may also display a notification (e.g., an icon and so on) indicating that an advertisement is being displayed on the widget.

Figure 22:
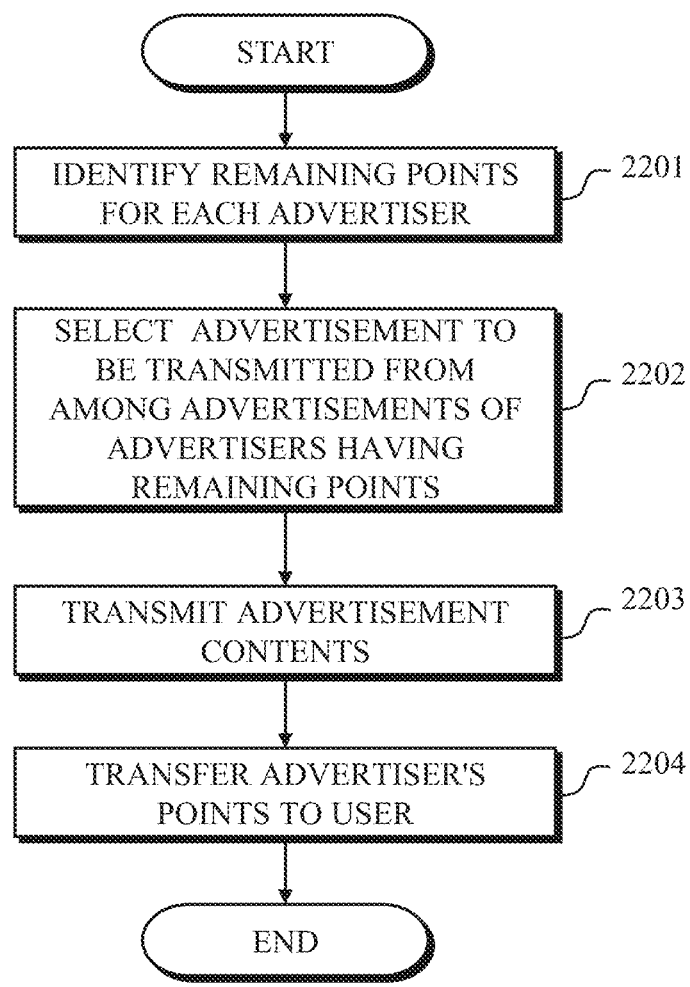
FIG. 22 illustrates a procedure for managing points in response to displaying advertisement contents in a system according to an embodiment of the present disclosure.
Figure 23:
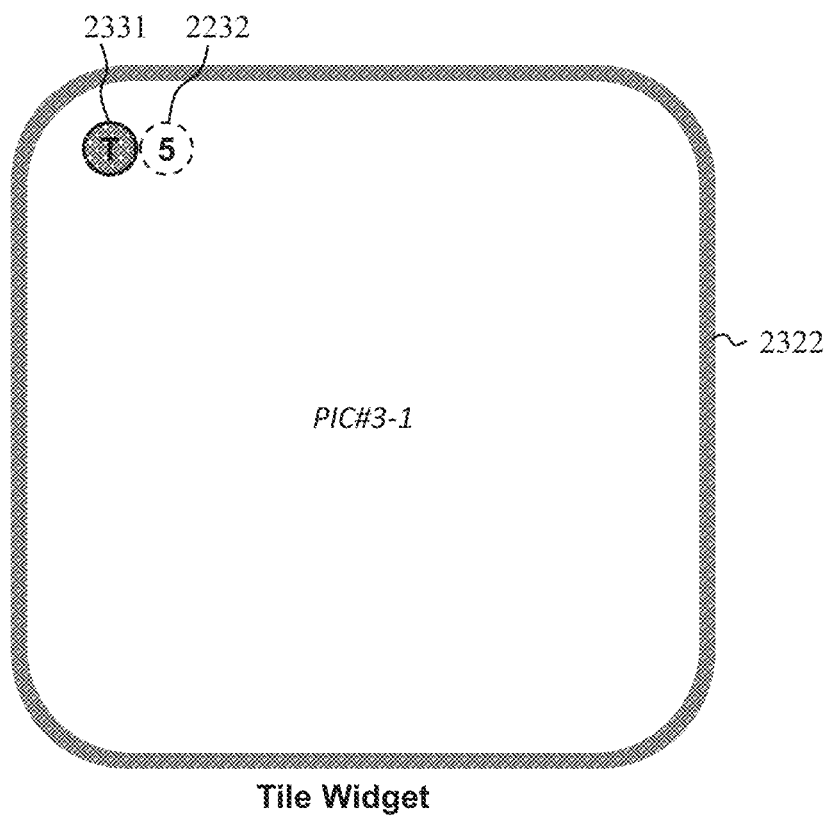
FIG. 23 illustrates an example of an indicator for point attainability displayed on a widget in a mobile electronic device according to an embodiment of the present disclosure.

In step 2006, the mobile electronic device 110 interacts with the server 120 with respect to the advertisement. The interaction related to the advertisement may be performed according to a user's reaction to the advertisement contents. For example, additional advertisement contents may be provided, or log information on advertisement consumption may be managed. Some embodiments related to the advertisement-related interaction are shown in FIGS. 21 to 23.

Figure 21:
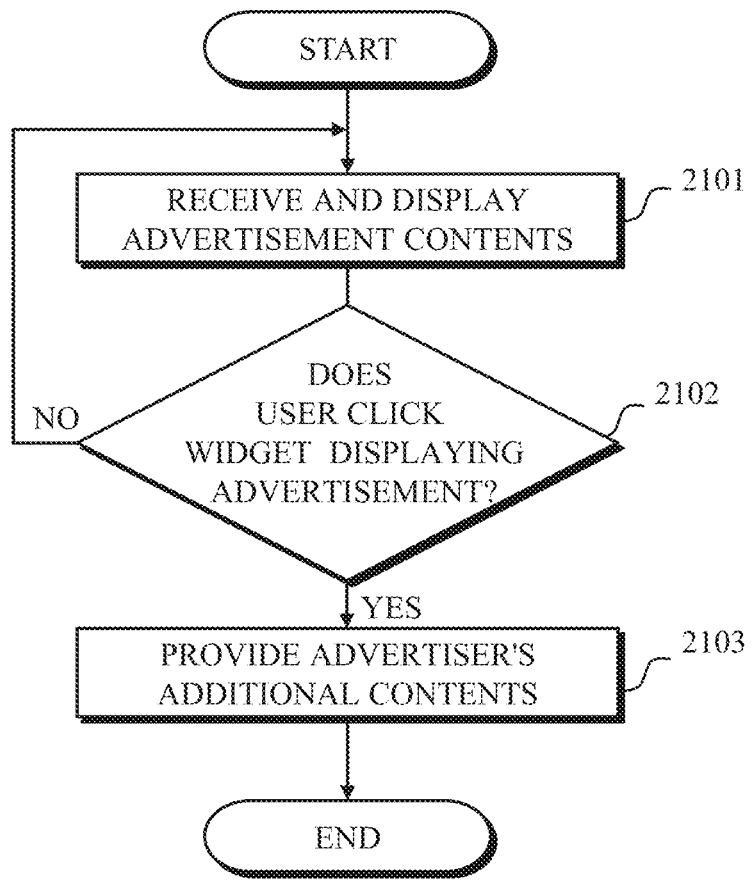
FIG. 21 illustrates a procedure for providing additional content of an advertiser in a system according to an embodiment of the present disclosure.

FIG. 21 illustrates a procedure for providing additional content of an advertiser in a system according to an embodiment of the present disclosure. FIG. 21 exemplifies operations performed by the mobile electronic device 110.

Referring to FIG. 21, in step 2101, the mobile electronic device 110 receives and displays advertisement contents. For example, the mobile electronic device 110 may acquire and display advertisement contents according to the procedure of FIG. 20.

In step 2102, the mobile electronic device 110 identifies whether a user clicks a widget that is displaying advertisement. In other words, the mobile electronic device 110 identifies whether the user is interested in the advertisement.

If the widget displaying advertisement is clicked, in step 2103, the mobile electronic device 110 provides an advertiser's additional contents to the user. The additional contents may vary according to an operation configured in the advertisement contents. For example, the mobile electronic device 110 may execute an advertiser's application. Alternatively, the mobile electronic device 110 may access an advertiser's website. Access to the website may be performed by executing an application of the tile widget service to access or by redirecting using an external web browser. Accordingly, the mobile electronic device 110 may further display other advertisements or access the product sales page.

As described above, the tile widget may provide advertisements through the widget. In this case, various types of content (e.g., an image, text, a web page, a video and so on) exist for each advertisement. A User gets a reward for the consumption of the advertisements, and a value of the reward may be applied differently for each content. For example, points defined in units of TWG may be provided as the reward. Hereinafter, an embodiment related to the point will be described with reference to FIG. 22.

FIG. 22 illustrates a procedure for managing points in response to displaying advertisement contents in a system according to an embodiment of the present disclosure. FIG. 22 exemplifies operations performed by the server 120. The procedure illustrated in FIG. 22 may be performed when the server 120 is required to transmit advertisement contents to the mobile electronic device 110.

Referring to FIG. 22, in step 2201, the server 120 identifies remaining points for each advertiser. The points are allocated for each advertiser, and the points are consumed as the advertisement contents of the corresponding advertiser is transmitted. The points may be newly allocated by an agreement between the operator of the tile widget and the advertiser. Since advertisement contents are transmitted to numerous users, points can change in real time.

In step 2202, the server 120 selects an advertisement to be transmitted from among advertisements of the advertisers having the remaining points. Since the advertisement of the advertiser who does not have points is not provided to users, the server 120 identifies an advertiser whose points are not exhausted, that is, at least one advertiser having a right for advertisement transmission. That is, the server 120 determines candidates of transmittable advertisements. Then, the server 120 selects advertisement contents to be transmitted based on other conditions (e.g., a user's location, a picture displayed on the widget, a user's feed analysis result, a user's activity analysis result and so on) from among the determined candidates.

In step 2203, the server 120 transmits advertisement contents to the mobile electronic device 110. A form of the advertisement contents may be various, such as an image, a video, a web page, and the like. In addition, the advertisement contents have different exposure time or consumption time according to advertisements.

In step 2204, the server 120 transfers the advertiser's points to a user of the mobile electronic device 110. According to how much the advertisement is exposed, the advertiser's points are paid. In this case, a amount of the paid points may be determined based on a type of the advertisement, the exposure time of the advertisement, and the like. In addition, at least some of the points are given to the user in proportion to the amount of the used points.

As described above, according to the transmission of advertisements, the advertiser's points are paid, and thus the user gets points. The tile widget service provides a reward for consuming advertisements, such as 1 TWG, 5 TWG and so on. The advertiser may be exposed to the user as much as TWG points the advertiser have, and the advertisements may be automatically stopped when all the points are exhausted. The user who has got points can use the points in various ways in the tile widget service. For example, the user may use points for exposing his/her album to all users, purchasing goods from a tile widget shop, and the like.

In the procedure described with reference to FIG. 22, the points are transferred to the user without any conditions. However, according to another embodiment of the present disclosure, a condition may be applied to the transferring of the points. For example, the points may be provided on condition that another content is received by clicking on the widget that is transmitting the advertisement. In this case, in order to avoid duplicate payment, points may be paid at a first click for each user and each advertisement.

According to an embodiment, in a state that advertisements could be displayed on the widget, the mobile electronic device 110 may display at least one indicator that the points can be obtained by advertisement consumption. For example, an indicator as shown in FIG. 23 may be displayed. FIG. 23 illustrates an example of an indicator for point obtainability displayed on a widget in a mobile electronic device according to an embodiment of the present disclosure. Referring to FIG. 23, a point icon 2331 and a point value 2332 obtainable by a user by consuming advertisements may be displayed in the widget. If the icon 2331 and the point value 2332 are not displayed, it means that the advertisement is not capable to be provided, that is, it is a normal widget. Conversely, if the icon 2331 and the point value 2332 are displayed, it means a widget providing the advertisement, that it, an advertisement widget.

The points provided to the user may vary according to the user's actions. That is, the tile widget service may define actions of a user that can provide additional points to the user, and provide additional points to the user when an action designated by the advertiser occurs. According to various embodiments of the present disclosure, the action may be defined in various ways. In order to provide additional points according to the action, the mobile electronic device 110 may perform a procedure as shown in FIG. 24 below.

Figure 24:
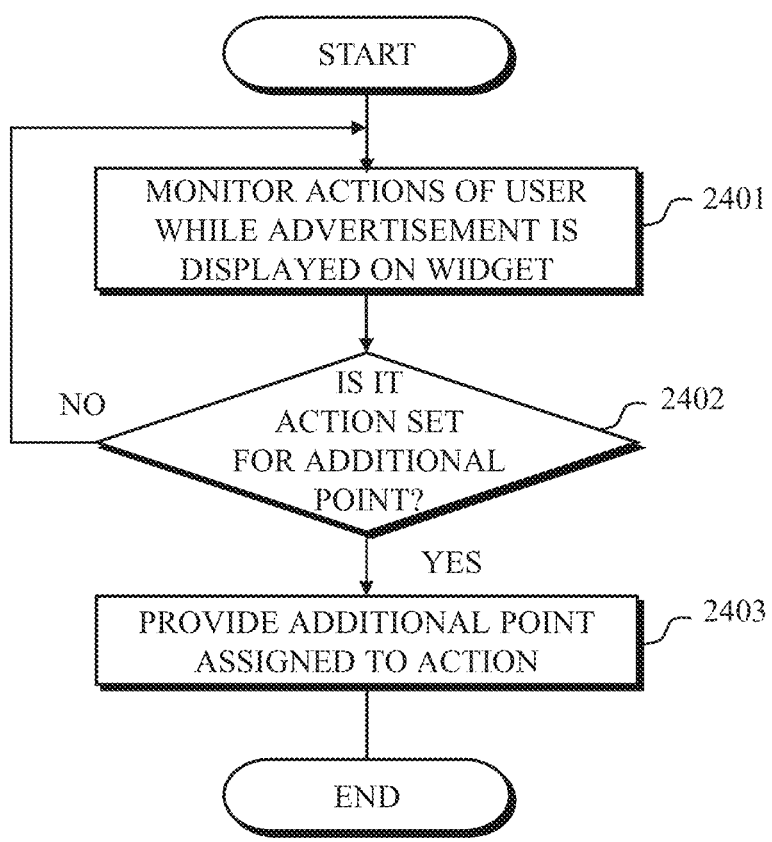
FIG. 24 illustrates a procedure for providing additional points in a system according to an embodiment of the present disclosure.

FIG. 24 illustrates a procedure for providing additional points in a system according to an embodiment of the present disclosure. FIG. 24 exemplifies operations performed by the mobile electronic device 110. The procedure illustrated in FIG. 24 may be performed while the mobile electronic device 110 displays an advertisement on the widget.

Referring to FIG. 24, in step 2401, the mobile electronic device 110 monitors actions of a user while an advertisement is displayed on a widget. Here, the action means a user's manipulation (e.g., a touch, a click and so on) by interacting with the mobile electronic device 110 or the user's state (e.g., a facial expression, a gaze and so on) independent of the mobile electronic device 110. To this end, the mobile electronic device 110 may use a camera, a sensor, or the like.

In operation 2402, the mobile electronic device 110 determines whether the identified action corresponds to one of actions set for an additional point. Here, the set actions are actions designated by a corresponding advertiser among actions defined in the tile widget service. For example, the actions may include gazing at the advertisement displayed on the widget for more than a certain period of time, changing the size of the widget while displaying the advertisement, changing the position of the widget while displaying the advertisement, touching or clicking on the widget displaying the advertisement and so on.

If the identified action corresponds to one of the actions set for the additional point, in step 2403, the mobile electronic device 110 provides the user with the additional point assigned to the action. Since the points are managed by the server 120, the mobile electronic device 110 may transmit a report that the set action is identified to the server 120, and the server 120 may allocate additional points to the user's account.

In the procedure described with reference to FIG. 24, the mobile electronic device 110 determines whether the identified action is one of the actions set for the additional point. To this end, the mobile electronic device 110 may receive information about the set actions from the server 120. When an application for the tile widget service is installed in the mobile electronic device 110, a list of actions is stored as application data. The list of actions includes an index, and indexes of the set actions may be transmitted together advertisement contents when the server 120 provides the advertisement contents to the mobile electronic device 110.

According to another embodiment, whether the identified action matches the set action may be determined by the server 120 rather than the mobile electronic device 110. In this case, the mobile electronic device 110 transmits information on the identified action in step 1901 to the server 120, and steps 1902 and 1903 may be omitted. That is, the mobile electronic device 110 has a list of actions defined as detection targets regardless of whether or not designated by an advertiser, and when actions defined as detection targets occur, a report including an index of the action is transmitted to the server (120).

In the embodiment as described above, as an example of an action, the gazing at the advertisement displayed on the widget during more than a predetermined time has been described. In this case, the mobile electronic device 110 activates the camera while the advertisement is displayed on the widget, recognizes eye(s) from a face the user in an image input through the camera, and uses the image of eye(s) to recognize where the user gazes to within the display of the mobile electronic device 110. For example, the mobile electronic device 110 obtains an eye image including the user's pupil(s), and then determines a location where an external light source is focused within the user's pupil(s). The mobile electronic device 110 may determine the location of a center of the pupil based on a correlation between the location of the external light source and the location where external light source is focused within the pupil, and determine a location where a line extended from the center of the pupil meets the display as a position to where the user gazes. In addition, a different type of sensor other than the camera may be used or another algorithm is used to determine the position of the gaze. Then, the mobile electronic device 110 measures the time that the user is gazing in the widget where the advertisement is being displayed, and if the time exceeds a threshold time, the occurrence of the action is determined.

In order to detect an action such as the gazing, the mobile electronic device 110 may use an artificial intelligence (AI) algorithm. The mobile electronic device 110 stores a neural network model for the AI algorithm in a memory to directly perform an inference operation, or transmits input data to another external device having the neural network model (e.g., the server 120 or another server) and receive a result of the inference operation. Here, the neural network model includes a plurality of layers consisting of a plurality of nodes, and includes an artificial neural network trained by learning data. Various artificial neural networks may exist depending on behavior(s) to be detected.

As aforementioned embodiment, the size of the widget may change according to a user's manipulation while displaying advertisements. As the size of the widget changes, the advertisement contents being displayed may be changed. For example, it is possible to change a size of the contents, display predefined contents to change according to the change in the size of the widget, display a new advertisement or a user picture additionally in an area obtained according to the increase in the size of the widget and so on.

Figure 25:
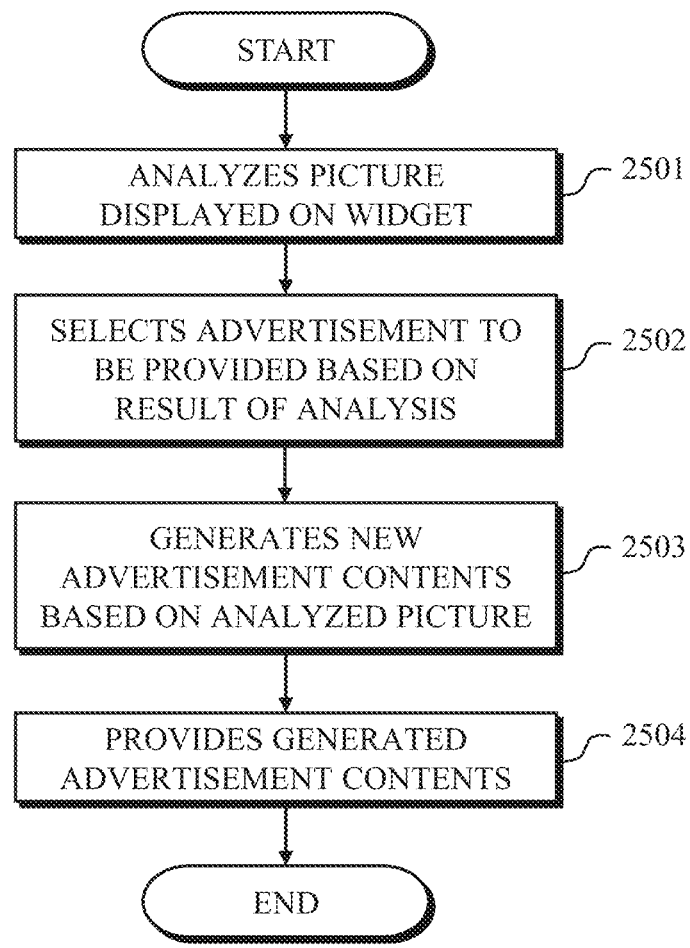
FIG. 25 illustrates a procedure for providing advertisement content generated based on a picture on which a widget is displayed in a system according to an embodiment of the present disclosure.

FIG. 25 illustrates a procedure for providing advertisement contents generated based on a picture on which a widget is displayed in a system according to an embodiment of the present disclosure. FIG. 25 exemplifies operations performed by a server 125. The procedure illustrated in FIG. 25 may be performed when the server 125 is required to transmit advertisement contents to the mobile electronic device 110.

Referring to FIG. 25, in step 2501, the server 125 analyzes a picture displayed on the widget. The server 125 analyzes at least one of pictures displayed in the currently generated widget, that is, pictures in a tile associated with the widget. Here, the analysis may vary depending on a way of generating new advertisement contents to be performed below. For example, the server 125 may recognize an object in the picture, a position/angle/arrangement of the recognized object, classify a background and a subject, a width of the background, the position of the subject, and the like.

In step 2502, the server 120 selects an advertisement to be provided based on a result of the analysis. For example, the server 120 selects the advertisement according to the result of the analysis, among at least one advertisement from advertisements of advertisers that satisfy another condition (e.g., remaining points). For example, the server 120 may select an advertisement suitable for generating advertisement contents using a new picture according to the result of the analysis. In this case, the selected advertisement may be one or plural.

In step 2503, the server 120 generates new advertisement contents based on the analyzed picture. According to various embodiments of the present disclosure, various advertisement contents may be generated under the condition that a format can be displayed on the widget. According to various embodiments of the present disclosure, the advertisement contents is generated based on a synthesis of an advertisement image and a user picture. For example, the server 120 may generate a new image in which the advertisement image and a picture image are mixed, or a video in which the advertisement image and the picture image are alternatively displayed on a time axis.

In step 2504, the server 120 provides the generated advertisement contents. That is, the server 120 transmits data including the generated advertisement contents to the mobile electronic device 110. In this case, the data may include advertisement contents itself or information (e.g., URL) for accessing the advertisement contents.

In the procedure described with reference to FIG. 25, the server 120 analyzes the picture and selects the advertisement to be provided. According to another embodiment of the present disclosure, the server 120 may first select the advertisement and analyze the picture. In this case, the format of the generated advertisement contents may vary according to the analysis result for the picture. The format of the advertisement contents can be defined in various ways, for example, a format in which a screen of the widget is split to display a user picture in a part of a tile and an advertisement image in another part of the tile, a format in which a part of the user picture is removed in units of pixels and an advertisement image is inserted, a format in which a user picture and an advertisement image are displayed alternatively on a time axis, and the like.

In the case of splitting the screen, since only a part of the widget screen can be used and thus only a part of the user picture can be displayed, it is preferable to be applied when a background other than a main subject is present in the picture by a certain ratio or more. Therefore, according to an embodiment, the server 120 identifies the subject by analyzing the picture, calculates an occupancy rate of the background excluding the subject, and applies the screen split format if the occupancy rate is equal to or greater than a threshold rate. To this end, the server 120 may analyze an area of the background other than the subject in the user picture, a location of the subject in the picture, and the like. In this case, a ratio of the screen split may also be adjusted based on the occupancy ratio equal to or greater than the threshold ratio.

In the case of using the screen split format, a color filter may be further applied to the advertisement. To make the displayed advertisement more attractive to users, the server 120 applies the color filter to the advertisement image to have a color tone in a specific combination relationship with a representative color of the user image displayed together through screen division. To this end, the server 120 obtains color analysis data (e.g., a color histogram and so on) for a portion of the user image displayed in the split region, and determines the representative color based on the color analysis data. Then, the color filter of a color tone having the specific combination relationship with the representative color of the user image is applied to the advertisement image.

According to an embodiment, the specific combination relationship may be a color combination (e.g., a complementary color combination) relationship that is well known as a conspicuous color combination, and in this case, the server 120 uses a predefined color matching table. According to another embodiment, the specific combination relationship may be a color combination relationship that is learned based on users' actions on advertisements. In this case, the server 120 may collect user actions that occur while the advertisement is being displayed, and use a color combination that is used when an action considered as the user being interested (e.g., action causing additional point provision) occurs as the specific combination relationship. In the case that the color combination relationship is defined according to user's actions, the color combination relationship may change according to accumulated statistics.

In the case of inserting the advertisement image, the server 120 may analyze whether there is a target object to be replaced with an advertised object among objects in the picture. That is, the server 120 may determine whether the target object to be replaced with the advertised object exist and which a pixel region the target object is located by using an object recognition technology. Then, the server 120 replaces a pixel region occupied by the target object with an image of the advertised object. In this case, the image of the advertised object may be scaled and/or rotated according to the identified pixel region. For example, when a person is holding a drink can in the picture and am advertisement for drink is to be provided, it is possible to replace the pixel region of the drink can held by the person with an image of drink that is the advertised object. In this case, in order to obtain a high-quality result, various image synthesis techniques may be used. For example, an AI deep fake technology may be applied. In this case, a graphic effect (e.g., adding a border to the advertisement image, adding an indicator, blinking an added graphic and so on) for emphasizing that the advertisement is synthesized may be added.

In the cast that the advertisement image is inserted, a result of the image synthesis may be perceived as unnatural or awkward for the users to recognize. For this case, according to an embodiment of the present disclosure, the mobile electronic device 110 may provide a function that allows the user to modify the synthesized image himself. To this end, the user may input a command to display an interface for modifying the synthesized image. For example, when a long press touch input occurs on the widget for a predetermined time or longer, the mobile electronic device 110 displays a menu in pop-up style, and the menu may include a 'synthesized image edit' item. If the synthesized image edit item is selected, the mobile electronic device 110 displays an editing interface for image edit of the synthesized part. The editing interface is a tool that can modify color values in units of pixels, and may provide functions such as enlarging the synthesized part, showing alternative color candidates by long-pressing the pixel, and changing the color of the pixel if a color is selected by the user. When the synthesized image is modified by the user, the mobile electronic device 110 transmits it to a device storing the artificial neural network as training data. Accordingly, the artificial neural network may be further trained, thereby increasing the accuracy of image synthesis. In this way, the present embodiment can provide an effect of reserving new learning data by the user.

The mobile electronic device according to an embodiment of the present disclosure may provide various user experiences (UX) through the tile widget service.

The method, the apparatus and the system according to various exemplary embodiments of the present disclosure described above may be implemented in an installation data form and be provided in servers or devices in a state in which it is stored in various non-transitory computer readable media. For example, the installation data may be produced in the form of an installation file and may be provided in a way of an online download, and for this purpose, it may be stored in a server accessible through an online software market. Therefore, user devices may access a server in which the installation data file stored to download the installation file.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), a random access memory (RAM), an erasable programmable ROM (EPROM), an electrically erasable programmable ROM (EEPROM), a flash memory or the like.

Although the exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

What is claimed is:

1. A method for providing a tile widget service in a mobile electronic device, the method comprising:
    displaying, by the mobile electronic device, in an application screen, a first feed corresponding to a first tile that includes a first plurality of pictures of a first user and a second feed corresponding to a second tile that includes a second plurality of pictures of the first user by using an application for the tile widget service, the first user is different from a second user that is a user of the mobile electronic device;
    detecting, by the mobile electronic device, in a home screen, commands of the second user for generating a widget of the application and selecting the first tile;
    generating, by the mobile electronic device, the widget associated with the first tile, in response to detecting the commands;
    displaying, by the mobile electronic device, on the widget that is generated in the home screen, a first picture among the first plurality of pictures and a comment inputted with respect to the first picture; and
    displaying a second picture among the first plurality of pictures and another comment inputted with respect to the second picture on the widget, when a predetermined time interval is passed after the first picture is displayed, wherein each of the first tile and second tile is a logical group of pictures, and wherein the logical group is a unit expressible as a feed in the application screen and a unit exposable on a home screen widget.

2. The method of claim 1, wherein the first plurality of pictures includes the first picture and a second picture, and wherein the first feed includes the first picture and the second picture that are arranged to be displayed simultaneously in different sizes.

3. The method of claim 1, further comprising:

when a new picture is uploaded to the first tile before the predetermined time interval is passed, displaying the new picture on the widget before displaying the second picture.

4. The method of claim 1, further comprising:

receiving, from a server controlling the tile widget service, advertisement contents; and displaying the advertisement contents on the widget.

5. The method of claim 4, further comprising:

displaying a first indicator informing that at least one point is able to be obtained by consuming the advertisement contents and a second indicator informing of an amount of the at least one point on the widget, while the advertisement contents is displayed.

6. The method of claim 4, further comprising:

detecting an action of the second user while the advertisement contents are displayed on the widget; and in case that the action is one of preconfigured actions, transmitting, the server, a report informing that an action set for an additional point is detected, wherein the preconfigured actions comprise a first action that the second user gazes at the advertisement contents displayed on the widget for more than a certain period of time, a second action that the second user changes a size of the widget while displaying the advertisement contents, a third action that the second user changes a position of the widget while displaying the advertisement contents, and a fourth action that the second user touches on the widget displaying the advertisement contents, and wherein the report includes an index of the detected action among the first action, the second action, the third action and the fourth action.

7. The method of claim 4, wherein the advertisement contents include a synthesized image that is generated by synthesizing the first picture and an image of an advertised object of the advertisement contents, and wherein the synthesized image includes a graphic effect for emphasizing the image of the advertised object.

8. The method of claim 7, wherein the synthesized image is generated by:

determining a target object to be replaced with the advertised object in the first picture by using an object recognition technology;

scaling and/or rotating the image of the advertised object based on a pixel region occupied by the target object;

replacing the pixel region with the image of the advertised object.

9. The method of claim 7, further comprising:

displaying an editing interface for modifying the synthesized image;

modifying the synthesized image by changing a color of at least one pixel of the synthesized image in response to user inputs; and transmitting, to the server, the modified synthesized image as learning data for training an artificial neural network.

10. The method of claim 1, wherein the first picture is displayed with a border shape same as the tile widget.

11. The method of claim 1, wherein the first plurality of pictures includes the first picture and a second picture, wherein the first picture is displayed in a first size on the first feed, wherein the second picture is displayed in a second size on the first feed, and wherein each of the first size and the second size is one of sizes applicable to the widget.

12. The method of claim 11, wherein the second picture is partially displayed at an initial state of the first feed, wherein an entire of the second picture is displayed in response to a left-right swipe touch input on the first feed.

13. The method of claim 12, further comprising:

detecting the left-right swipe touch input on the first feed;

changing a display area for the first feed based on a direction of the left-right swipe touch input.

14. The method of claim 13, wherein the first feed includes the first plurality of pictures that is arranged in a rectangular region, wherein the display area is located at a left end of the board at the initial state, and wherein the display area is changed toward a right end of the rectangular region in response to the left-right swipe touch input from right to left.

15. The method of claim 1, wherein the first feed includes the first picture displayed in a first size, a second picture displayed in a second size and a third picture displayed in a third size, wherein the first size is defined as having a width and a height that are both equal to a first distance, wherein the second size is defined as having a width equal to the first distance and a height equal to a second distance, wherein the third size is defined as having a width and a height that are both equal to the second distance, and wherein the second distance is a half of the first distance.

16. A mobile electronic device for providing a tile widget service in, the mobile electronic device comprising:

a memory storing program codes executable by a processor; and the processor coupled to the memory and configured to:

display, in an application screen, a first feed corresponding to a first tile that includes a first plurality of pictures of a first user and a second feed corresponding to a second tile that includes a second plurality of pictures of the first user by using an application for the tile widget service, the first user is different from a second user that is a user of the mobile electronic device;

detect, in a home screen, commands of the second user for generating a widget of the application and selecting the first tile;

generate the widget associated with the first tile, in response to detecting the commands;

display, on the widget that is generated in the home screen, a first picture among the first plurality of pictures and a comment inputted with respect to the first picture; and display a second picture among the first plurality of pictures and another comment inputted with respect to the second picture on the widget, when a predetermined time interval is passed after the first picture is displayed, wherein each of the first tile and second tile is a logical group of pictures, and wherein the logical group is a unit expressible as a feed in the application screen and a unit exposable on a home screen widget.

17. A computer program product, comprising a computer readable hardware storage device storing a computer readable program code, the computer readable program code comprising an algorithm that when executed by a computer processor of a computing system implements a method comprising:

displaying, in an application screen, a first feed corresponding to a first tile that includes a first plurality of pictures of a first user and a second feed corresponding to a second tile that includes a second plurality of pictures of the first user by using an application for the tile widget service, the first user is different from a second user that is a user of the mobile electronic device;

detecting in a home screen, commands of the second user for generating a widget of the application and selecting the first tile;

generating the widget associated with the first tile, in response to detecting the commands; and displaying, on the widget that is generated in the home screen, a first picture among the first plurality of pictures and a comment inputted with respect to the first picture; and displaying a second picture among the first plurality of pictures and another comment inputted with respect to the second picture on the widget, when a predetermined time interval is passed after the first picture is displayed, wherein each of the first tile and second tile is a logical group of pictures, and wherein the logical group is a unit expressible as a feed in the application screen and a unit exposable on a home screen widget.

* * * * *